(12) United States Patent
Mineyama

(10) Patent No.: US 7,650,619 B2
(45) Date of Patent: Jan. 19, 2010

(54) VIRTUAL PROGRAM LIST PROVIDING SYSTEM

(75) Inventor: Toru Mineyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1623 days.

(21) Appl. No.: 09/979,969

(22) PCT Filed: Mar. 28, 2001

(86) PCT No.: PCT/JP01/02595

§ 371 (c)(1),
(2), (4) Date: Mar. 14, 2002

(87) PCT Pub. No.: WO01/74060

PCT Pub. Date: Oct. 4, 2001

(65) Prior Publication Data

US 2003/0121041 A1      Jun. 26, 2003

(30) Foreign Application Priority Data

Mar. 29, 2000   (JP) .............................. 2000-095307

(51) Int. Cl.
  *H04N 5/445*   (2006.01)
  *G06F 3/00*    (2006.01)
  *G06F 13/00*   (2006.01)
(52) U.S. Cl. ................ 725/46; 725/9; 725/34
(58) Field of Classification Search ............ 725/34, 725/46, 9
See application file for complete search history.

(56) References Cited

U.S. PATENT DOCUMENTS

| 5,754,938 | A  | * | 5/1998  | Herz et al. ........... 725/116 |
| 5,758,257 | A  | * | 5/1998  | Herz et al. ........... 725/116 |
| 6,449,632 | B1 | * | 9/2002  | David et al. .......... 709/202 |
| 6,738,978 | B1 | * | 5/2004  | Hendricks et al. ...... 725/35 |
| 7,140,032 | B2 | * | 11/2006 | Dew et al. ............ 725/46 |
| 7,207,053 | B1 | * | 4/2007  | Asmussen ............. 725/42 |

(Continued)

FOREIGN PATENT DOCUMENTS

JP       10-075219       3/1998

(Continued)

*Primary Examiner*—Jason P Salce
(74) *Attorney, Agent, or Firm*—Finnegan, Henderson, Farabow, Garrett and Dunner, L.L.P.

(57) ABSTRACT

A control unit (15) of a virtual program table producing apparatus (2) produces users program viewing inclination information on the basis of a program viewing history of a user stored by a storage unit (12) accumulated in a data base (11) for storing a program viewing history of a program viewed by a user, classifies users into a group on the basis of individual information of a user, produces group program viewing inclination information showing that each group views what program from the program viewing history of a user belonging to each group, organizes each program broadcast in a plurality of real channels having a predetermined frequency band in a virtual channel virtually having a frequency band owned by the plurality of real channels on the basis of the user's taste, the user program viewing inclination information and the group program viewing inclination information, fetches program information of a virtual channel organized from the data base (11) for accumulating program information which is attribute information of a program broadcast in the real channels, and arranges the fetched program information on the basis of the virtual channel to produce a virtual program table.

43 Claims, 25 Drawing Sheets

U.S. PATENT DOCUMENTS

| | | | |
|---|---|---|---|
| 2002/0054752 A1 * | 5/2002 | Wood et al. | 386/83 |
| 2006/0271958 A1 * | 11/2006 | Ukai et al. | 725/46 |

FOREIGN PATENT DOCUMENTS

| | | |
|---|---|---|
| JP | 10-162027 | 6/1998 |
| JP | 10-257405 | 9/1998 |
| JP | 11-187324 | 7/1999 |
| JP | 11-284968 | 10/1999 |

* cited by examiner

| | AT 20 | AT 21 | AT 22 | | | | |
|---|---|---|---|---|---|---|---|
| | 30 | | 0 | 30 | | | |
| VC-1 | OO SCIENCE [EXPLA-NATION] | | DIGITAL VIDEO 00% PRACTICAL USE [EXPLA-NATION] | CUTE ANGEL KENT [EXPLA-NATION] | | | |
| VC-2 | | | | | | | |
| VC-3 | | | | | | | |
| VC-4 | | | | | | | |

FIG.12

| | AT 20 | | AT 21 | | AT 22 | |
|---|---|---|---|---|---|---|
| | 0 | 30 | | | 0 | 30 |
| VC-1 | NEWS/STOCK PRICE COMMENTARY [EXPLANATION] | OO SCIENCE [EXPLANATION] | | | DIGITAL VIDEO 00% PRACTICAL USE [EXPLANATION] | CUTE ANGEL KENT [EXPLANATION] |
| VC-2 | OO NEWS [EXPLANATION] | NEWS & SPORTS [EXPLANATION] | | | | |
| VC-3 | | | | | | |
| VC-4 | | | | | | |

FIG.14

| | | AT 20 | | AT 21 | AT 22 | |
|---|---|---|---|---|---|---|
| | 0 | 30 | | | 0 | 30 |
| VC-1 | NEWS/STOCK PRICE COMMENTARY [EXPLANATION] | ○○ SCIENCE [EXPLANATION] | | | DIGITAL VIDEO ○○% PRACTICAL USE [EXPLANATION] | CUTE ANGEL KENT [EXPLANATION] |
| | 0 | 30 | | | | |
| VC-2 | ○○ NEWS [EXPLANATION] | NEWS & SPORTS ○○ [EXPLANATION] | | | | |
| | 0 | | | | | |
| VC-3 | ○○ FEATURE [EXPLANATION] | | | | | |
| | 0 | | | | | |
| VC-4 | XX MUSIC [EXPLANATION] | | | | | |

FIG.15

| | | AT 20 | | AT 21 | | AT 22 | |
|---|---|---|---|---|---|---|---|
| | | 0 | 30 | | | 0 | 30 |
| VC-1 | | NEWS/STOCK PRICE COMMENTARY [EXPLA-NATION] | OO SCIENCE [EXPLA-NATION] | | | | DIGITAL VIDEO OO% PRACTICAL USE [EXPLA-NATION] | CUTE ANGEL KENT [EXPLA-NATION] |
| VC-2 | | OO NEWS [EXPLA-NATION] | NEWS & SPORTS OO [EXPLA-NATION] | | | | |
| VC-3 | | OO FEATURE [EXPLA-NATION] | | | | | |
| VC-4 | | XX MUSIC [EXPLA-NATION] | OLYMPIC [EXPLA-NATION] | | | | |

FIG.16

| FILE(F) EDIT(E) VIEW(V) JUMP(J) COMMUNICATOR(C) HELP(H) | | | | | | |
|---|---|---|---|---|---|---|
| RETURN NEXT HOME PRINT STOP | | | | | | |
| | | AT 20 | | AT 21 | | AT 22 |
| | 0 | 30 | 0 | | 0 | 30 |
| VC-1 | NEWS/STOCK PRICE COMMENTARY | OO SCIENCE [EXPLA-NATION] | WORLD OO SOCCER [EXPLA-NATION] | | DIGITAL VIDEO OO%PRACTICAL USE [EXPLA-NATION] | CUTE ANGEL KENT [EXPLA-NATION] |
| | 0 | 30 | 0 | | | |
| VC-2 | OO NEWS [EXPLA-NATION] | NEWS & SPORTS OO [EXPLA-NATION] | OO FOREIGN FILM THEATER [EXPLA-NATION] | | | |
| | 0 | | 0 | | | 30 |
| VC-3 | OO FEATURE [EXPLA-NATION] | | RELICS OO EXPLORATION [EXPLA-NATION] | | | BOWLING △△ [EXPLA-NATION] |
| | 0 | 30 | 0 | | | 30 |
| VC-4 | XX MUSIC [EXPLA-NATION] | OLYMPIC □□ [EXPLA-NATION] | FRIDAY DRAMA OO [EXPLA-NATION] | | | NEWS OO [EXPLA-NATION] |

FIG.17

| | | AT 20 | AT 21 | AT 22 |
|---|---|---|---|---|
| CH1 | | XX PROFESSIONAL WRESTLING | FRIDAY DRAMA ○○ [EXPLANATION] | 0 LA2NextWeek |
| CH2 | | 0 ○○ FEATURE | 0 ◎◎ FOREIGN FILM [EXPLANATION] | |
| CH3 | | 0 XX MUSIC [EXPLANATION] | 0 □□ MOTHER NATURE | 0 BOWLING△△ [EXPLANATION] | 30 CUTE ANGEL KENT [EXPLANATION] |
| CH4 | | 0 XX QUIZ SHOW | 0 ○○ THEATER [EXPLANATION] | |
| CH5 | | 0 ○○ NEWS [EXPLANATION] | 30 OLYMPIC □ [EXPLANATION] | WORLD ○○ SOCCER | 0 (FRENCH FILM ◎◎ TILL 24) [EXPLANATION] |
| CH6 | | △△ FISHING [EXPLANATION] | NEWS & SPORTS ◎◎ [EXPLANATION] | RELIC ◎◎ EXPLORATION | 0 TRAVELING ABROAD ○○ INFORMATION [EXPLANATION] |
| CH7 | | △△ JAPANESE FILM THEATER | | |
| CH8 | | 0 ◎◎ Count Down | NEW CAR INFORMATION XX FEATURE | 0 DIGITAL VIDEO ○'s PRACTICAL USE NEWS ○○ [EXPLANATION] 22 ○○ DRAMA |
| CH9 | | NEWS/STOCK PRICE COMMENTARY [EXPLANATION] | 30 ○○ SCIENCE [EXPLANATION] | △△ THEATER [EXPLANATION] | 30 XX 2/4 [EXPLANATION] | 0 ◎◎ OF YESTERDAY [EXPLANATION] |
| CH10 | | 0 △△ CHALLENGE [EXPLANATION] | 0 SWORD OF ◎◎ [EXPLANATION] | 0 NY ○○ [EXPLANATION] |

FIG.20

| | | AT 20 | | AT 21 | | AT 22 | |
|---|---|---|---|---|---|---|---|
| | 0 | 30 | 0 | | 0 | 30 | |
| VC-1 | NEWS/STOCK PRICE COMMENTARY [EXPLANATION][CANCEL] | OO SCIENCE [EXPLANATION][CANCEL] | WORLD OO SOCCER [EXPLANATION][CANCEL] | | DIGITAL VIDEO 00% PRACTICAL USE [EXPLANATION][CANCEL] | CUTE ANGEL KENT [EXPLANATION][CANCEL] | |
| | 0 | 30 | 0 | | | | |
| VC-2 | OO NEWS [EXPLANATION][CANCEL] | NEWS & SPORTS ○○ [EXPLANATION][CANCEL] | ○○ FOREIGN FILM THEATER [EXPLANATION][CANCEL] | | | | |
| | 0 | | 0 | | | | |
| VC-3 | OO FEATURE [EXPLANATION][CANCEL] | | RELICS ○○ EXPLORATION [EXPLANATION][CANCEL] | | | BOWLING △△ [EXPLANATION][CANCEL] | |
| | 0 | 30 | 0 | | | 30 | |
| VC-4 | XX MUSIC [EXPLANATION][CANCEL] | OLYMPIC □□ [EXPLANATION][CANCEL] | FRIDAY DRAMA ○○ [EXPLANATION][CANCEL] | | | NEWS ○○ [EXPLANATION][CANCEL] | |

FIG.21

FILE(F) EDIT(E) VIEW(V) JUMP(J) COMMUNICATOR(C) HELP(H)

RETURN NEXT HOME PRINT STOP

| | AT 20 | | AT 21 | | AT 22 | |
|---|---|---|---|---|---|---|
| | 0 | | 0 | | 0 | |
| CH1 | XX PROFESSIONAL WRESTLING | EXPLA-NATION / RESERVATION | FRIDAY DRAMA ◎◎ | EXPLA-NATION / RESERVATION | LA2NextWeek | EXPLA-NATION / RESERVATION |
| | 30 | | 0 | | 30 | |
| CH3 | XX MUSIC | EXPLA-NATION / RESERVATION | ◎◎ INTRODUCTION | EXPLA-NATION / RESERVATION | BOWLING △△ | EXPLA-NATION / RESERVATION |
| | 0 | | 0 | | CUTE ANGEL KENT | EXPLA-NATION / RESERVATION |
| CH5 | ○○ NEWS | EXPLA-NATION / RESERVATION | □□ MOTHER NATURE | EXPLA-NATION / RESERVATION | (FRENCH FILM ◎◎ TILL 24) | EXPLA-NATION / RESERVATION |
| | 30 | | 0 | | 0 | |
| | OLYMPIC □ | EXPLA-NATION / RESERVATION | WORLD ○○ SOCCER | EXPLA-NATION / RESERVATION | | |
| | 0 | | 0 | | 0 | |
| CH9 | NEWS/STOCK PRICE ○○ SCIENCE COMMENTARY | EXPLA-NATION / RESERVATION | △△ THEATER | EXPLA-NATION / RESERVATION | ◎◎ OF YESTERDAY | EXPLA-NATION / RESERVATION |

FIG.22

| | | AT 20 | | AT 21 | | AT 22 | |
|---|---|---|---|---|---|---|---|
| CH1 | 0 | XX PROFESSIONAL WRESTLING [EXPLANATION] | 0 | FRIDAY DRAMA ○○ [EXPLANATION] | 0 | LA2NextWeek [EXPLANATION] | 0 |
| CH3 | 0 | XX MUSIC [EXPLANATION] | 30 | ○○ INTRODUCTION [EXPLANATION] | 0 | MOTHER NATURE [EXPLANATION] | 0 | BOWLING △△ [EXPLANATION] | 30 | CUTE ANGEL KENT [EXPLANATION] |
| CH5 | 0 | ○○ NEWS [EXPLANATION] | 30 | OLYMPIC □ [EXPLANATION] | 0 | WORLD ○○ SOCCER [EXPLANATION] | 0 | (FRENCH FILM ○○ TILL 24) |
| CH9 | 0 | NEWS/STOCK PRICE COMMENTARY [EXPLANATION] | ○○ SCIENCE [EXPLANATION] | 0 | △△ THEATER [EXPLANATION] | 0 | ○○ OF YESTERDAY [EXPLANATION] | 0 |

FIG.23

```
START PROGRAM RECORDING RESERVATION SETTING SCRIPT:
COMMAND ID, RECORDING DEVICE ID, INFRA ID, CHANNEL, BROADCASTING
START TIME, BROADCASTING END TIME, TITLE 1
FINISH PROGRAM RECORDING RESERVATION SETTING SCRIPT:
START PROGRAM RECORDING RESERVATION SETTING SCRIPT:
COMMAND ID, RECORDING DEVICE ID, INFRA ID, CHANNEL,
BROADCASTING START TIME, BROADCASTING END TIME, TITLE 2
FINISH PROGRAM RECORDING RESERVATION SETTING SCRIPT:
```

FIG.25

```
START PROGRAM RECORDING RESERVATION SETTING SCRIPT:
RECORDING DEVICE ID 1:
COMMAND ID, INFRA ID, CHANNEL, BROADCASTING START TIME,
BROADCASTING END TIME, TITLE 11
COMMAND ID, INFRA ID, CHANNEL, BROADCASTING START TIME,
BROADCASTING END TIME, TITLE 12
RECORDING DEVICE ID 2:
COMMAND ID, INFRA ID, CHANNEL, BROADCASTING START TIME,
BROADCASTING END TIME, TITLE 21
COMMAND ID, INFRA ID, CHANNEL, BROADCASTING START TIME,
BROADCASTING END TIME, TITLE 22
FINISH PROGRAM RECORDING RESERVATION SETTING SCRIPT:
```

FIG.26

VIRTUAL PROGRAM LIST PROVIDING SYSTEM

TECHNICAL FIELD

The invention relates to an EPG (Electronic Program Guide) for presenting program information in a digital multi-channel broadcasting.

BACKGROUND OF THE INVENTION

With the establishment of a digital multi-channel broadcasting, programs corresponding to various tastes of users have been presented.

However, there is a problem that the multi-channel brings forth excessive information so that a user has difficulty precisely selecting by what channel the program desired is presented or what channel presents the program in accord with own taste merely from an EPG (Electronic Program Guide) transmitted from an enterpriser.

For meeting the problem described above, there has been executed a method of previously registering channels presenting user's favourite programs in an STB (Set Top Box), producing and displaying a program table comprising merely from program information of the registered channels when program information is transmitted from an enterpriser, and presenting the user program information.

On the other hand, recording and making a reservation on a program to be broadcast is done by referring to program information to be presented, selecting a program in accord with own taste, and inputting information such as recording data, time and a channel. There is a further method of reading a code set to each program in advance by an exclusive-use input device, and setting reservation for recording a program.

Further, when a user's favourite content is presented from a group of contents composed of a plurality of contents corresponding to the aforementioned program including one or more of stationary image data, moving image data, voice data and text data, a content program guide for visually indicating a user in what group of contents the desired content is classified and presented to a user. The content program guide corresponds to the aforementioned program table and has content information as attribute information of contents arranged on the basis of the content group. There is carried out a method wherein when a user gets access to a content presenting device in order to obtain the desired content, the user refers to the content program guide to thereby obtain information to what content group of the content presenting device the desired content belongs.

The method of presenting program information as described above presents only the program information of a channel which was judged and registered in advance by an user to the effect that such program information is in accord with own taste.

The channels are, for example, a channel for exclusively broadcasting a movie, a channel for exclusively broadcasting sports, or a channel for exclusively broadcasting news. It is supposed that a certain user registered a channel for exclusively broadcasting a movie, and a channel for exclusively broadcasting news. When EPG is transmitted from an enterpriser, STB produces and presents the user a program table comprising only the program information of the registered channel, hereupon, program information of only two channels of a channel for exclusively broadcasting a movie, and a channel for exclusively broadcasting news. However, in a case where for example, the user is not interested in sports as compared with a movie or news, but somewhat interested in soccer, and there is a soccer game the user wants to see, there occurs a problem that the user passes it over because program information was not presented.

Channels are divided into a kind of genre so that it is easy for a user to select a channel, and if the user selects a channel in accordance therewith, there is the possibility that programs the user feels to be interested be increased. However, there is a problem that all programs in each channel selected by an enterpriser are not a program felt to be interested for the user.

On the other hand, for recording and making reservation of a program, it is necessary for a user to carry out operation to make recoding and making reservation as described in the prior art, posing a problem that when a plurality of programs are recorded, operation becomes very cumbersome.

Further, since contents administrated and presented by each content presenting device are vast, the content program guide presented to a user also has a vast quantity of content information. Accordingly, since a user is necessary to search a vast quantity of content information for obtaining the desired contents, there is a problem that great labour be required.

DISCLOSURE OF THE INVENTION

From the foregoing, the present invention has been accomplished. It is an object of the invention to provide a virtual program table producing apparatus for indicating program information reflective of user's taste, a virtual program table presenting system, a virtual program table presenting method, a program recording system for automatically recording a program in a recording medium on the basis of program information reflective of user's taste, a program recording method, and a virtual content program guide producing apparatus for indicating content information reflective of user's taste.

A virtual program table producing apparatus according to the present invention comprises storage means for storing a program viewing history of programs viewed by a user; user program viewing inclination information producing means for producing user program viewing inclination information showing what program a user views on the basis of the user's program viewing history stored by the storage means; group program viewing inclination information producing means for producing group program viewing inclination information showing what program each group views from the user's program viewing history belonging to each group; virtual channel organizing means for organizing programs broadcast in a plurality of real channels having a predetermined frequency band into virtual channels for virtually having frequency bands owned by the plurality of real channels on the basis of user's taste, user program viewing inclination information produced by user program viewing inclination information producing means and group program viewing inclination information produced by group program viewing inclination information producing means; program information accumulation means for accumulating program information as attribute information of programs broadcast in real channels; and virtual program table producing means for fetching program information of virtual channels organized by virtual channel organizing means from program information accumulation means and arranging program information fetched from program information accumulation means on the basis of the virtual channels to produce a virtual program table.

The above virtual program table producing apparatus produces a virtual program table in which program information of programs interested by a user and a group to which the user belongs are arranged.

Further, a virtual program table producing method according to the present invention produces user program viewing inclination information showing what program a user views on the basis of a user's program viewing history; classifies users into groups on the basis of individual information of a user; produces group program viewing inclination information showing what program each group views from a program viewing history of a user belonging to each group; organizes programs broadcast in a plurality of real channels having a predetermined frequency band into virtual channels virtually having frequency bands owned by a plurality of real channels on the basis of user's taste, user program viewing inclination information and group program viewing inclination information; and arranging program information as attribute information of programs organized in virtual channels on the basis of virtual channels to produce a virtual program table.

The above virtual program table producing method produces a virtual program table in which program information of programs interested by a user and a group to which the user belongs are arranged.

Further, a virtual program table presenting system according to the present invention comprises a virtual program table producing apparatus comprising storage means for storing a program viewing history of programs viewed by a user; user program viewing inclination information producing means for producing user program viewing inclination information showing what program a user views on the basis of the user's program viewing history stored by the storage means; group program viewing inclination information producing means for producing group program viewing inclination information showing what program each group views from the user's program viewing history belonging to each group; virtual channel organizing means for organizing programs broadcast in a plurality of real channels having a predetermined frequency band into virtual channels for virtually having frequency bands owned by the plurality of real channels on the basis of user's taste, user program viewing inclination information produced by user program viewing inclination information producing means and group program viewing inclination information produced by group program viewing inclination information producing means; program information accumulation means for accumulating program information as attribute information of programs broadcast in real channels; virtual program table producing means for fetching program information of virtual channels organized by virtual channel organizing means from program information accumulation means and arranging program information fetched from program information accumulation means on the basis of the virtual channels to produce a virtual program table; and transmission means for transmitting a virtual program table produced by virtual program table producing means, and a virtual program table receiving apparatus comprising input means for inputting individual information of a user; first receiving means for receiving a virtual program table transmitted by transmission means of a virtual program table producing apparatus; and output display means for outputting and displaying a virtual program table received by first receiving means.

The above virtual program table presenting system produces a virtual program table in which program information of programs interested by a user and a group to which the user belongs are arranged to present the virtual program table to the user.

Further, a virtual program table presenting method according to the present invention produces user program viewing inclination information showing what program a user views on the basis of a user's program viewing history; classifies users into groups on the basis of individual information of a user; input individual information showing attribute of a user; classifies users into groups on the basis of individual information; produces group program viewing inclination information showing what program each group views from a program viewing history of a user belonging to each group; organizes programs broadcast in a plurality of real channels having a predetermined frequency band into virtual channels virtually having frequency bands owned by a plurality of real channels on the basis of user's taste, user program viewing inclination information and group program viewing inclination information; arranging program information as attribute information of a program organized in a virtual channel on the basis of a virtual channel to produce a virtual program table; transmits the produced virtual program table; receives the transmitted virtual program; and outputs and displays the received virtual program table.

The above virtual program table presenting method produces a virtual program table in which in which program information of programs interested by a user and a group to which the user belongs are arranged to present the virtual program table to the user.

Further, a program recording system according to the present invention comprises a virtual program table producing apparatus comprising storage means for storing a program viewing history of programs viewed by a user; user program viewing inclination information producing means for producing user program viewing inclination information showing what program a user views on the basis of the user's program viewing history stored by the storage means; group program viewing inclination information producing means for producing group program viewing inclination information showing what program each group views from the user's program viewing history belonging to each group; virtual channel organizing means for organizing programs broadcast in a plurality of real channels having a predetermined frequency band into virtual channels for virtually having frequency bands owned by the plurality of real channels on the basis of user's taste, user program viewing inclination information produced by user program viewing inclination information producing means and group program viewing inclination information produced by group program viewing inclination information producing means; program information accumulation means for accumulating program information as attribute information of programs broadcast in real channels; virtual program table producing means for fetching program information of programs arranged in virtual channels organized by virtual channel organizing means from program information accumulation means and arranging program information fetched from program information accumulation means on the basis of the virtual channels to produce a virtual program table; first transmission means for transmitting a virtual program table produced by virtual program table producing means; program recording reservation setting script producing means for producing program recording reservation setting script as a control command for recording a program arranged in a virtual channel in a recording medium; and second transmission means for transmitting program recording setting script produced by program recording reservation setting script producing means, a program recording reservation setting script receiving apparatus comprising input means for inputting individual information of a user; first receiving means for receiving a virtual program table transmitted by first transmission means; output and display means for outputting and displaying a virtual program table received by first receiving means; second receiving means for receiving program recording reservation setting script transmitted by second transmission means; signal conversion means for converting program recording reservation setting script received by second receiving means into a control signal; and third transmission means for transmitting a control signal converted by signal conversion means, and a recording apparatus comprising third receiving means for receiving a control signal transmitted by third transmission means; fourth receiving means for receiving programs arranged in a virtual channel; recording means for recording a program received by fourth receiving means in a recording medium; and control means for driving and controlling recording means so as to record a program received by fourth receiving means in a recording medium in response to a control signal received by third receiving means.

The above program recording system produces a virtual program table in which program information of programs interested by a user and a group to which the user belongs are arranged, and produces a control command for executing recording of programs on the basis of the virtual program table.

Further, a program recording method according to the present invention produces user program viewing inclination information showing what program a user views on the basis of a user's program viewing history; classifies users into groups on the basis of individual information of a user; input individual information showing attribute of a user; classifies users into groups on the basis of individual information; produces group program viewing inclination information showing what program each group views from a program viewing history of a user belonging to each group; organizes programs broadcast in a plurality of real channels having a predetermined frequency band into virtual channels virtually having frequency bands owned by a plurality of real channels on the basis of user's taste, user program viewing inclination information and group program viewing inclination information; produces program recording reservation setting script as a control demand for recording a program organized in a virtual channel in a recording medium, transmits the produced program recording reservation setting script, receives the produced program recording reservation setting script, converts the received program recording reservation setting script into a control signal, transmits a control signal, receives the transmitted control signal, and receives a program organized in a virtual channel in response to the received control signal to record it in a recording medium.

The above program recording method produces a virtual program table in which program information of programs interested by a user and a group to which the user belongs are arranged, and produces a control command for executing recording of programs on the basis of the virtual program table.

A virtual content program guide producing apparatus according to the present invention comprises storage means for storing a content utilizing history of contents utilized by a user; user content utilizing inclination information producing means for producing user content utilizing inclination information showing what content a user utilizes on the basis of the content utilizing history of a user stored by storage means; group content utilizing inclination information producing means for classifying users into a group on the basis of individual information of a user and producing group content utilizing inclination information showing what content each group utilizes from a content utilizing history of a user belonging to each group; content information detecting means for detecting content information as attribute information of contents; content information accumulation means for accumulating content information detected by content information detecting means; virtual content group organizing means for organizing contents of a real content group composed of a plurality of contents into a virtual content group as a virtual group on the basis of content utilizing inclination information produced by user content utilizing inclination information producing means and/or group content utilizing inclination information produced by group content utilizing inclination information producing means and content information accumulated by content information accumulation means; and virtual content program guide producing means for arranging content information accumulated by content information accumulation means on the basis of a virtual content group organized by virtual content group organizing means and producing virtual content program guide.

The above virtual content program guide producing apparatus a virtual content program guide in which content information of contents interested by a user and/or a group to which the user belongs are arranged.

BRIEF DESCRIPTION OF THE DRAWINGS

FIG. 12 is a view for explaining the process for arranging program information on a virtual program table in the virtual program table presenting system.

FIG. 14 is a view for explaining the process for arranging program information on a virtual program table in the virtual program table presenting system.

FIG. 15 is a view for explaining the process for arranging program information on a virtual program table in the virtual program table presenting system.

FIG. 16 is a view for explaining the process for arranging program information on a virtual program table in the virtual program table presenting system.

FIG. 17 is a view showing a virtual program table produced in the virtual program table presenting system.

FIG. 20 is a view for explaining a program table of a normal channel in the program recording system.

FIG. 21 is a view for explaining one example of a method for cancelling a program organized in a virtual channel in the program recording system.

FIG. 22 is a view for explaining one example of a method for organizing a program organized in a normal channel in the program recording system.

FIG. 23 is a view for explaining a program table of a request channel in the program recording system.

FIG. 25 is a view showing one example of program recording reservation setting scripts by program in the program recording system.

FIG. 26 is a view showing one example of blanket program recording reservation setting scripts in the program recording system.

BEST MODE FOR CARRYING OUT THE INVENTION

The mode of carrying out a virtual program table producing apparatus, a virtual program table producing method, a virtual program table presenting system and a virtual program table presenting method will be described in detail hereinafter.

Here, a virtual channel and a virtual program table produced according to the present invention will be described.

In a TV broadcasting, a program is carried on and by an electric wave (radio) having a predetermined frequency band transmitted from a broadcasting station on the ground, a BS (Broadcasting Satellite) or a CS (Communications Satellite). In the aforementioned frequency band, the number for identification given is 1 to 1, which is a normal channel.

On the other hand, a virtual channel selects a program being broadcast in a normal channel on the basis of user's taste instead of the number given to a predetermined frequency band, which is arranged in accordance with a predetermined rule to thereby provide a situation as if a program is broadcast in a predetermined frequency band. In other words, the virtual channel is able to obtain all frequency bands of the normal channel, and apparently, the frequency band is changed every program.

The virtual program table is a table arranged in time series every virtual channel in order visually indicate when and by which virtual channel the program organized in the aforementioned virtual channel is broadcast with respect to a user.

Figure 1:
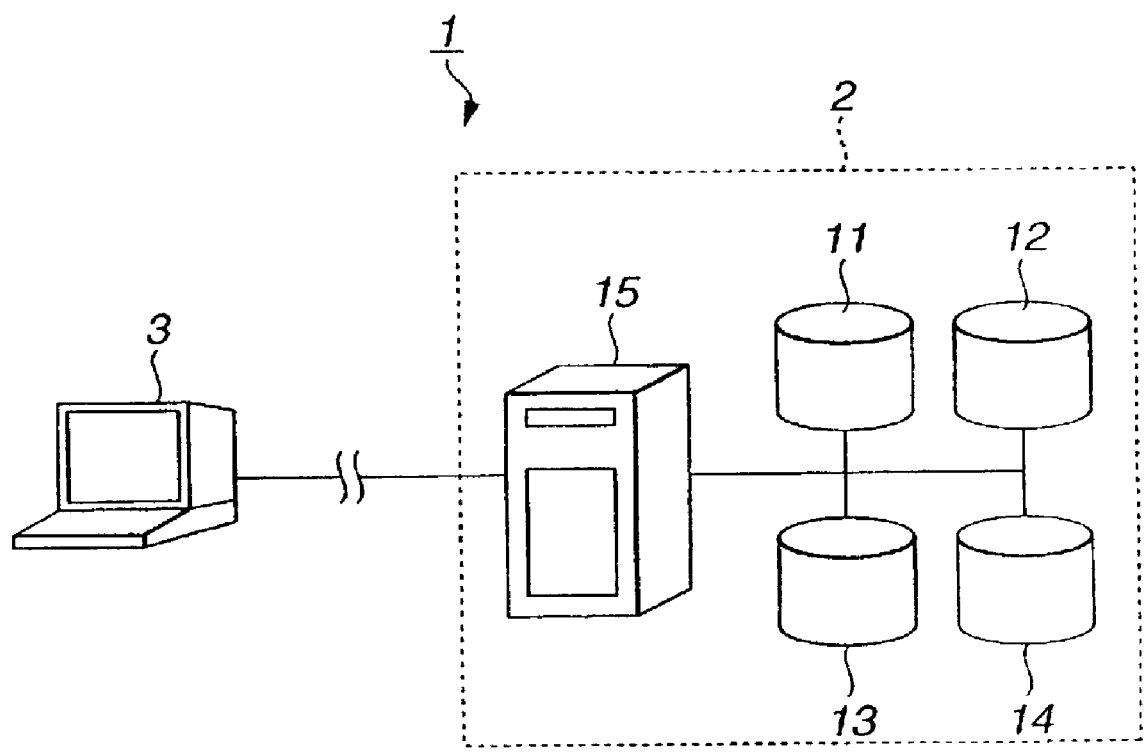
FIG. 1 is a schematic view for explaining the constitution of a virtual program table presenting system shown as an embodiment according to the present invention.

The present invention is applied to the constitution such as a virtual program table presenting system 1 shown in FIG. 1, for example.

The virtual program table presenting system 1 comprises a virtual program table producing apparatus 2 for transmitting a virtual program table produced on the basis of a virtual channel, and a terminal device 3 for receiving a virtual program table transmitted from the virtual program table producing apparatus 2.

The virtual program table producing apparatus 2 comprises a data base 11, a data base 12, a data base 13, a data base 14, and a control unit 15.

The data base 11 accumulates program information shown in Table 1 as attribute information presented by an enterpriser not shown.

TABLE 1

| | | | Program Information | | | |
|---|---|---|---|---|---|---|
| Date | Day | Start Time | Time | Title | Cate. | Keyword |
| 2000.09.01 | Fri. | 19:30:00 | 0:30:00 | Quiz ◎ ◎ | 7 | Arimura ΔΔ |
| 2000.09.01 | Fri. | 20:00:00 | 0:30:00 | News/stock price commentary | 6 | Sato○○ |
| 2000.09.01 | Fri. | 20:00:00 | 0:30:00 | ○○News | 6 | Nakamura○○ |
| 2000.09.01 | Fri. | 20:00:00 | 0:30:00 | xxMusic | 4 | Kitayama xx |
| 2000.09.01 | Fri. | 20:00:00 | 2:00:00 | ΔΔ Japanese film theatre | 1 | Yamada ◎ ◎ |
| 2000.09.01 | Fri. | 20:00:00 | 1:00:00 | xx Quiz | 7 | Maeda xx |
| 2000 09.01 | Fri. | 20:00:00 | 1:00:00 | ◎ ◎ Count Down | 4 | Kitagawa○○ |
| 2000.09.01 | Fri. | 20:00:00 | 0:30:00 | ΔΔFishing xx | 8 | Suzuki ΔΔ |
| 2000.09.01 | Fri. | 20:00:00 | 1:00:00 | ΔΔChallenge | 7 | Takada xx |
| 2000.09.01 | Fri. | 20:00:00 | 1:00:00 | ○○ Feature | A | Murakami□ |
| 2000.09.01 | Fri. | 20:00:00 | 1:00.00 | xxPro-wres | 3 | Funaki ◎ ◎ |
| 2000.09.01 | Fri. | 20:30:00 | 0:30.00 | ◎ ◎ Introduction | 9 | Hara ΔΔ |
| 2000.09.01 | Fri. | 20:30:00 | 0:30:00 | News & sports ◎ ◎ | 6 | Harada ◎ ◎ |
| 2000.09.01 | Fri. | 20:30:00 | 0:30:00 | Olympic□□ | 3 | Takahashi ΔΔ |
| 2000.09.01 | Fri. | 20:30:00 | 0:30:00 | ○○Sience | A | Suzuki ◎ ◎ |
| 2000.09.01 | Fri. | 21:00:00 | 1:00:00 | □□Mother Nature | A | Sakamoto○○ |
| 2000.09.01 | Fri. | 21:00:00 | 1:00:00 | Friday drama ◎ ◎ | 5 | Katsura ◎ ◎ ◎ |
| 2000.09.01 | Fri. | 21:00:00 | 1:00:00 | Lelics◎ ◎ exploration | B | Shima○○ |
| 2000.09.01 | Fri. | 21:00:00 | 1:00:00 | New car information xxfeature | 8 | Matsubayashi □□ |

TABLE 1-continued

Program Information

| Date | Day | Start Time | Time | Title | Cate. | Keyword |
|---|---|---|---|---|---|---|
| 2000.09.01 | Fri. | 21:00:00 | 1:00:00 | World ○○soccer | 2 | Tanaka ΔΔ |
| 2000.09.01 | Fri. | 21:00:00 | 0:30:00 | Sword of ⊚ ⊚ | 9 | Murata ⊚ ⊚ |
| 2000.09.01 | Fri. | 21:00:00 | 2:00:00 | ⊚ ⊚ Foreign film theatre | 0 | Yodogawa xx |
| 2000.09.01 | Fri. | 21:00:00 | 1:00:00 | ΔΔTheatre | 5 | Inagaki ⊚ ⊚ |
| 2000.09.01 | Fri. | 21:00:00 | 2:00:00 | ○○Theatre | 0 | Tsuchiya○○ |
| 2000.09.01 | Fri. | 21:30:00 | 0:30:00 | xx 2/4 | 9 | Ikedai□□ |
| 2000.09.01 | Fri. | 22:00:00 | 2:00:00 | French movie ⊚ ⊚ | 0 | Makino ⊚ ⊚ v |
| 2000.09.01 | Fri. | 22:00:00 | 1:00:00 | Overseas Travel ○○information | 8 | Inoue○○ |
| 2000.09.01 | Fri. | 22:00:00 | 0:30:00 | Digital video ○○ % practica use | 8 | Yamashita xx |
| 2000.09.01 | Fri. | 22:00:00 | 1:00:00 | ⊚ ⊚ of yesterday | 5 | Mikami ΔΔ |
| 2000.09.01 | Fri. | 22:00:00 | 1:00:00 | NY○○ | 5 | Kimura xx |
| 2000.09.01 | Fri. | 22:00:00 | 1.00:00 | 22○○drama | 5 | Yamaguchi○○ |
| 2000.09.01 | Fri. | 22:00:00 | 1:00:00 | LA2NextWeek | 5 | George ⊚ ⊚ |
| 2000.09.01 | Fri. | 22:00:00 | 0:30:00 | Bowling ΔΔ | 8 | Nishida ΔΔ |
| 2000.09.01 | Fri. | 22:30:00 | 0:30:00 | News ⊚ ⊚ | 6 | Yamamura ⊚ ⊚ |
| 2000.09.01 | Fri. | 22:30:00 | 0:30:00 | Cute Angel Kent | 0 | Kent □□ |
| 2000.09.01 | Fri. | 23.00:00 | 1:00:00 | Space Time N○S○ | B | Tsuchiya ΔΔ |
| 2000.09.01 | Fri. | 23:00:00 | 1:00:00 | Music □ | 4 | Hase ○○ |
| 2000.09.01 | Fri. | 23:00:00 | 1:00:00 | Cook ⊚ ⊚ | 7 | Chin ⊚ ⊚ |

Program information, as attribute information, comprises, for example, such as a date, a day of the week on which program is broadcast, broadcasting start time of program, broadcasting terminating time of program (or broadcasting time of program instead), a category of program, a keyword of program, a channel number at which program is broadcast, a name of channel, an explanation of simplified content of program broadcast, etc.

In Table 1, a date and a day of the week on which a program is broadcast out of the aforementioned attribute information, broadcasting start time of a program, broadcasting time of a program, a category of a program, and a keyword of a program are shown as explained hereinafter.

In the Date column, a date on which program was broadcast is shown as in A.D., month, date, for example, "2000.09.08".

In the Day column, a day of the week on which program is broadcast is shown as in "Fri.", for example.

In the StartTime column, time at which program is broadcast is shown as in "19:30:00", for example.

In the Time column, broadcasting time of program broadcast is shown, for example, in case of 30 minutes, as in "0:30:00".

In the Title column, a title of program is shown, for example, as in "quiz⊚⊚".

In the Category column, a category of program is shown by a number described in Table 1, for example, "7". The category of program is a group a feature of program broadcast is classified into some genres, for example, each program is classified into 15 kinds of categories, as shown in Table 2.

TABLE 2

Category of Program

| Number | Category |
|---|---|
| 0 | Foreign film |
| 1 | Japanese film |
| 2 | Sports 1 |
| 3 | Sports 2 |

TABLE 2-continued

Category of Program

| Number | Category |
|---|---|
| 4 | Music |
| 5 | Drama/play |
| 6 | News/report |
| 7 | Variety show |
| 8 | Leisure/hobby |
| 9 | For children/education |
| A | Education/documentary |
| B | Overseas broadcasting |
| C | Adult |
| D | Digital radio |
| E | Others |
| F | — |

15 kinds of categories are expressed by 16 hexadecimal numerical values of 0~E. Further, the category classified into 15 kinds in Table 2 may be further subdivided, and each program may be further subdivided. The category with number F indicates a preliminary region.

The data base 12 accumulates program viewing histories showing what program a user viewed. The control unit 15, when a program is viewed by a user, accumulates, in the data base 12, a date on which a program was broadcast, a day of the week on which a program was broadcast, program start time, a title of program, a category by which programs are classified, and a keyword of program, as a program viewing history.

Here, a first method and a second method for confirming that a user has viewed a program will be explained.

First, the first method is a method for obtaining a rate how many hours a user viewed a program, and comparing it with a predetermined threshold for judgment. For example, let L be broadcasting time of program, T be a threshold, and M be hours a user viewed a program, then, in a case where the viewing time M is fulfilled with a n expression of $T \leq (M/L)$, recognition is made that the user viewed that program The threshold T may be constant in all programs or may be different every program. For example, the threshold of a drum or a movie which involves an important development in the latter half of program is set to be high, or the threshold of a program in which the most important information is indicated at the beginning of a program such as news is set to below.

The second method is a method in which when a user gets access to program information from a virtual program table output to the terminal device 3, that fact is so judged that the user viewed it. When a user gets access to program information, that is registered as a program viewing history in the data base 12 despite the user viewed or not viewed the applied program.

Incidentally, the fact that a user views a program can be judged that the user is interested in that program. Therefore, there can be considered that the program viewing history accumulated in the data base 12 reflects the user's taste.

So, the control unit 15 counts the number of times of program viewing by a user by a title of program, a category of program and a keyword of program from program viewing histories accumulated in the data base 12 to thereby prepare user program viewing inclination information indicating viewing inclination of a user to accumulate them in the data base.

The user program viewing inclination information includes a title list defined by a Title of program, a category list defined by a Category of program, and a keyword list defined by a program Keyword, which are accompanied by a Value representative of the number of times of viewing. The user program viewing inclination information forms one set by a category list, a title list, and a keyword list. The user program viewing inclination information can be set every hour in a unit of one week from Monday to Sunday. For example, various modes, for example, such as a mode having a set of user program viewing inclination information in unit of one hour every day of the week, a mode having two sets of user program viewing inclination information in one week in total, one set in the week day from Monday to Friday, and one set in the weekday of Saturday and Sunday, and a mode having one set of user program viewing inclination information from Monday to Sunday.

In the following explanations, the mode having a set of user program viewing inclination information in unit of one hour every day of the week is applied. For example, For example, in the the mode having a set of user program viewing inclination information in unit of one hour every day of the week, 24 hour per one day and 24×7=168 per week of user program viewing inclination information are prepared.

Figure 2:
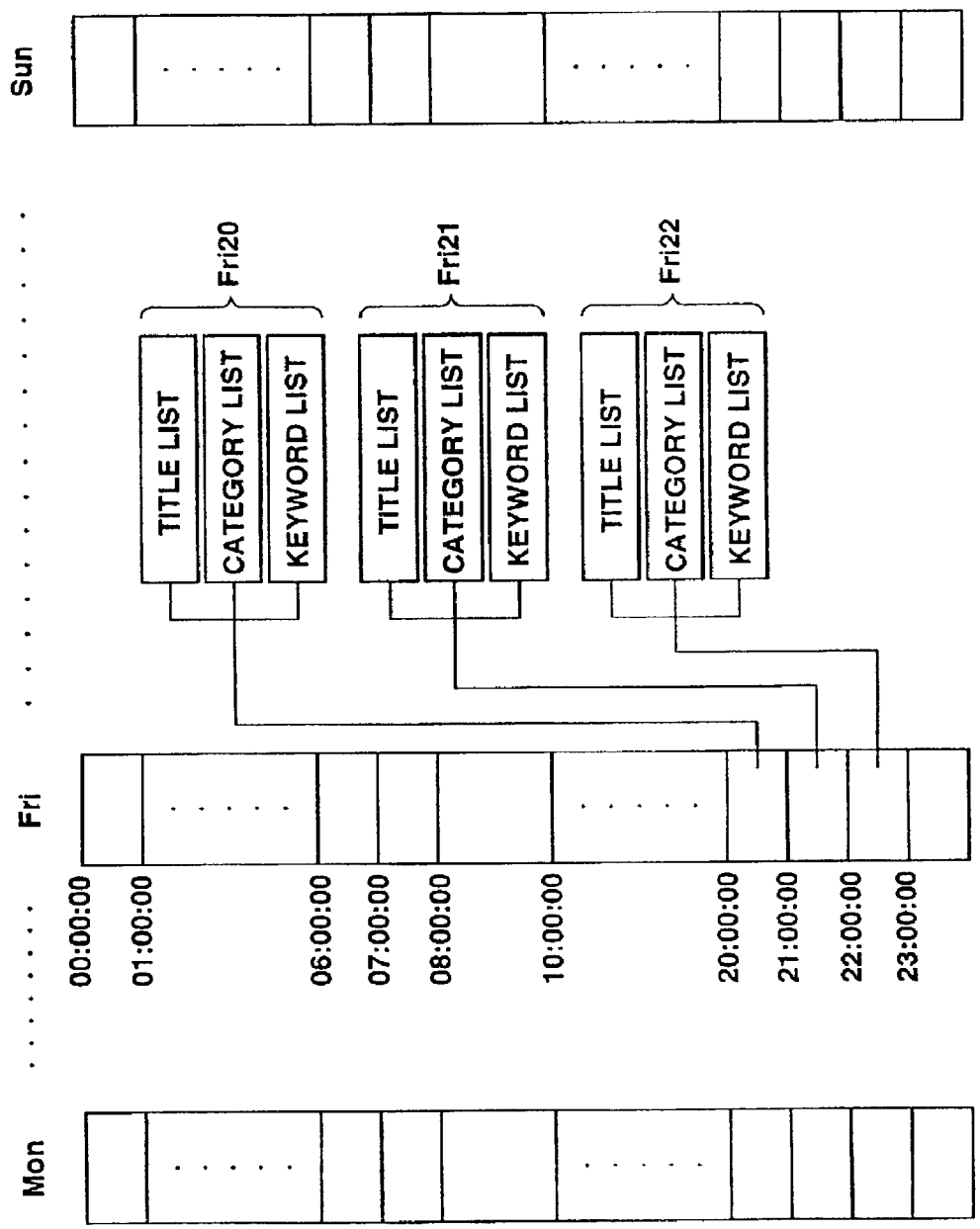
FIG. 2 is a view for explaining program viewing inclination information in the virtual program table presenting system.

As shown in FIG. 2, for example, when a contemplation is made of three hours from 20 to 23 on Friday, three sets of user program viewing inclination information are contemplated. Here, user program viewing inclination information used includes user program viewing inclination information Fri 20 from 20 to 21, user program viewing inclination information Fri 21 from 21 to 22, and user program viewing inclination information Fri 22 from 22 to 23.

A title list, a category list, and a keyword list of Fri 20 are shown in Table 3, Table 4, and Table 5, respectively. It is noted that up to three upper ranks of these lists are described in order of higher value.

TABLE 3

Title List

| Day | Time | Title | Value |
|---|---|---|---|
| Fri. | 20:00:00 | News/stock price commentary | 10 |
| Fri. | 20:30:00 | ○○Science | 7 |
| Fri. | 20:00:00 | ○○News | 2 |

TABLE 4

Category List

| Day | Time | Category | Value |
|---|---|---|---|
| Fri. | 20:00:00 | News/report (6) | 12 |
| Fri. | 20:00:00 | Education/documentary (A) | 7 |
| Fri. | 20:00:00 | Music (4) | 1 |

TABLE 5

Keyword List

| Day | Time | Keyword | Value |
|---|---|---|---|
| Fri. | 20:00:00 | Sato ○○ | 15 |
| Fri. | 20:30:00 | Suzuki ◎ ◎ | 7 |
| Fri. | 20:00:00 | Kitayama xx | 2 |

The title list shown in Table 3 has information of a day of the week on which program is broadcast, program start time, a title of program, and values. For example, the program of highest value in the title list of Table 3 is a program of a title "News/stock price commentary" which starts at 20, whose value is 10.

The category list shown in Table 4 has information of a day of the week on which program is broadcast, program start time, a category of program, and values. For example, the category of highest value in the category list of Table 4 is a category "News/Report", whose value is 12.

The keyword list shown in Table 5 has information of a day of the week on which program is broadcast, program start time, a category of program, and values.

The keyword of program will be explained. The keyword of program is, for example, a person's name shown in Table 5, and this person's name is a person appeared on the program. The keyword is, for example, a performer appeared every time on the program or a guest performer featurizing the program. For example, the keyword of the highest value in the keyword list of Table 5 is a keyword "Sato OO", whose value is 15.

A method for counting values, that is, counting of values after what hour program has been viewed will be explained in detail later.

A title list, a category list, and a keyword list of Fri 21 are shown in Table 6, Table 7, and Table 8, respectively; and a title list, a category list, and a keyword list of Fri 22 are shown in Table 9, Table 10, and Table 11, respectively.

TABLE 6

Title List

| Day | Time | Title | Value |
|---|---|---|---|
| Fri. | 21:00:00 | World ○○ soccer | 9 |
| Fri. | 21:00:00 | ◎ ◎ foreign film theatre | 4 |
| Fri. | 21:00:00 | Relics ◎ ◎ exploration | 1 |

TABLE 7

Category List

| Day | Time | Category | Value |
|---|---|---|---|
| Fri. | 21:00:00 | Sports 1 (2) | 10 |
| Fri. | 21:00:00 | Foreign film (0) | 4 |
| Fri. | 21:00:00 | Overseas broadcasting (B) | 1 |

TABLE 8

Keyword List

| Day | Time | Keyword | Value |
|---|---|---|---|
| Fri. | 21:00:00 | Tanaka ΔΔ | 9 |
| Fri. | 21:00:00 | Yodogawa xx | 4 |
| Fri. | 21:00:00 | Shima○○ | 1 |

TABLE 9

Title List

| Day | Time | Title | Value |
|---|---|---|---|
| Fri. | 22:00:00 | LA2NextWeek | 8 |
| Fri. | 23:00:00 | Cute Angel Kent | 5 |
| Fri. | 22:00:00 | Bowling | 2 |

TABLE 10

Category List

| Day | Time | Category | Value |
|---|---|---|---|
| Fri. | 22:00:00 | Drama/play (5) | 8 |
| Fri. | 22:00:00 | Foreign film (O) | 5 |
| Fri. | 22:00:00 | Leisure/hobby (8) | 3 |

TABLE 11

Keyword List

| Day | Time | Keyword | Value |
|---|---|---|---|
| Fri. | 22:00:00 | George ◎◎ | 7 |
| Fri. | 22:30:00 | Kent□□ | 5 |
| Fri. | 22:00:00 | NishidaΔΔ | 1 |

The data base 13 accumulates individual information of a user.

The individual information includes age, sex distinction, a married person or not, and an occupation. The individual information is input from the terminal device 3 described later and registered, for example, when a user receives service in the virtual program table presenting system 1.

Further, the data base 13 accumulates broadcasting date and time, broadcasting time, and a title of a program a user desires to view without fail. If the program a user desires to view without fail is an absolute viewing program group, the absolute viewing program group is first organized in a virtual channel. The user inputs the absolute viewing program group from the terminal device 3 described later, similar to the aforementioned individual information.

The data base 14 accumulates group information of a group decided on the basis of individual information of a user accumulated in the aforementioned data base 13.

For obtaining group information, first, it is divided into groups on the basis of individual information accumulated in the data base 13. For example, the division of groups is carried out from individual information such as age, an occupation, a married person or not. The division of groups may be done by filtering in further detail than three categories of age, an occupation, a married person or not as described above, or reversely, by more roughly.

After the division of groups has been done, a program viewing history of an individual accumulated in the data base 12 is used to newly prepare program viewing inclination information of a group The program viewing inclination information of a group is accumulated in the data base 14 every group as group viewing inclination information.

For example, a contemplation is made of a user X who making use of the virtual program table presenting system 1 It is supposed that the user X inputs individual information such that age is an age of 30, unmarried, an occupation is an engineer from the terminal device 3 described later with the utilization of the virtual program table presenting system 1. The virtual program producing apparatus 2 produces one group, for example, a group A, from individual information by the control unit 15. Then the control unit 15 totals viewing histories of all users belonging to the group A in the data base 14 and newly prepares program viewing inclination information of a group as group program viewing inclination information. The group program viewing inclination information is accumulated in the data base 14 along with a Value representative of the number of times of viewing every Title of program, Category of program, and Keyword of program similar to the user program viewing inclination information.

The group program viewing inclination information forms a set comprising a category list, a title list, and a keyword list similar to the user program viewing inclination information. The group program viewing inclination information forms a set comprising a category list, a title list, and a keyword list. The group program viewing inclination information can be set every one hour in a unit of one week from Monday to Sunday. For example, it is possible to set various modes such as a mode having a set of group program viewing inclination information in unit of one hour every day of the week, a mode having two sets of group program viewing inclination information in one week in total, one set in the week day from Monday to Friday, and one set in the weak end of Saturday and Sunday, and a mode having one set of group program viewing inclination information from Monday to Sunday.

In the following explanations, the mode mode having a set of group program viewing inclination information in unit of one hour every day of the week is applied For example, in the mode mode having a set of group program viewing inclination information in unit of one hour every day of the week, 24 a day and 24×7=168 in a week of group program viewing inclination information are prepared.

When a contemplation is made of group program viewing inclination information for three hours from 20 to 23 on Friday similar to the user program viewing inclination information, three sets of group program viewing inclination information are contemplated. It is supposed that the group program viewing inclination information are GFri 20 from 20 to 21, GFri 21 from 21 to 22, and GFri 22 from 22 to 23.

A title list, a category list, and a keyword list of GFri 20 are shown in Table 12, Table 13, and Table 14, respectively. These lists are described up to three upper ranks in order of higher values.

TABLE 12

Title List

| Day | Time | Title | Value |
|---|---|---|---|
| Fri. | 20:00:00 | xx Pro-wres | 8 |
| Fri. | 20:00:00 | ○○News | 4 |
| Fri. | 20:00:00 | xxQuiz | 3 |

TABLE 13

Category List

| Day | Time | Category | Value |
|---|---|---|---|
| Fri. | 20:00:00 | Sports(3) | 12 |
| Fri. | 20:00:00 | News/Report(6) | 6 |
| Fri. | 20:00:00 | Variety show(7) | 2 |

TABLE 14

Keyword List

| Day | Time | Keyword | C |
|---|---|---|---|
| Fri. | 20:00:00 | Funaki ◎◎ | 5 |
| Fri. | 20:00:00 | Nakamura ○○ | 3 |
| Fri. | 20:00:00 | Tkahashi ▲▲ | 1 |

The title list shown in Table 12 has information of a day of the week on which program was broadcast, program start time, a title of program, and values. For example, the program whose value is highest of the title list in Table 12 is a program of title "xx pro-wres (professional wrestling)" starting at 20, whose value is 8.

The category list shown in Table 13 has information of a day of the week on which program was broadcast, program start time, a title of program, and values. For example, the category whose value is highest of the category list in Table 13 is a category of "Sports 2", whose value is 12.

Figure 4:
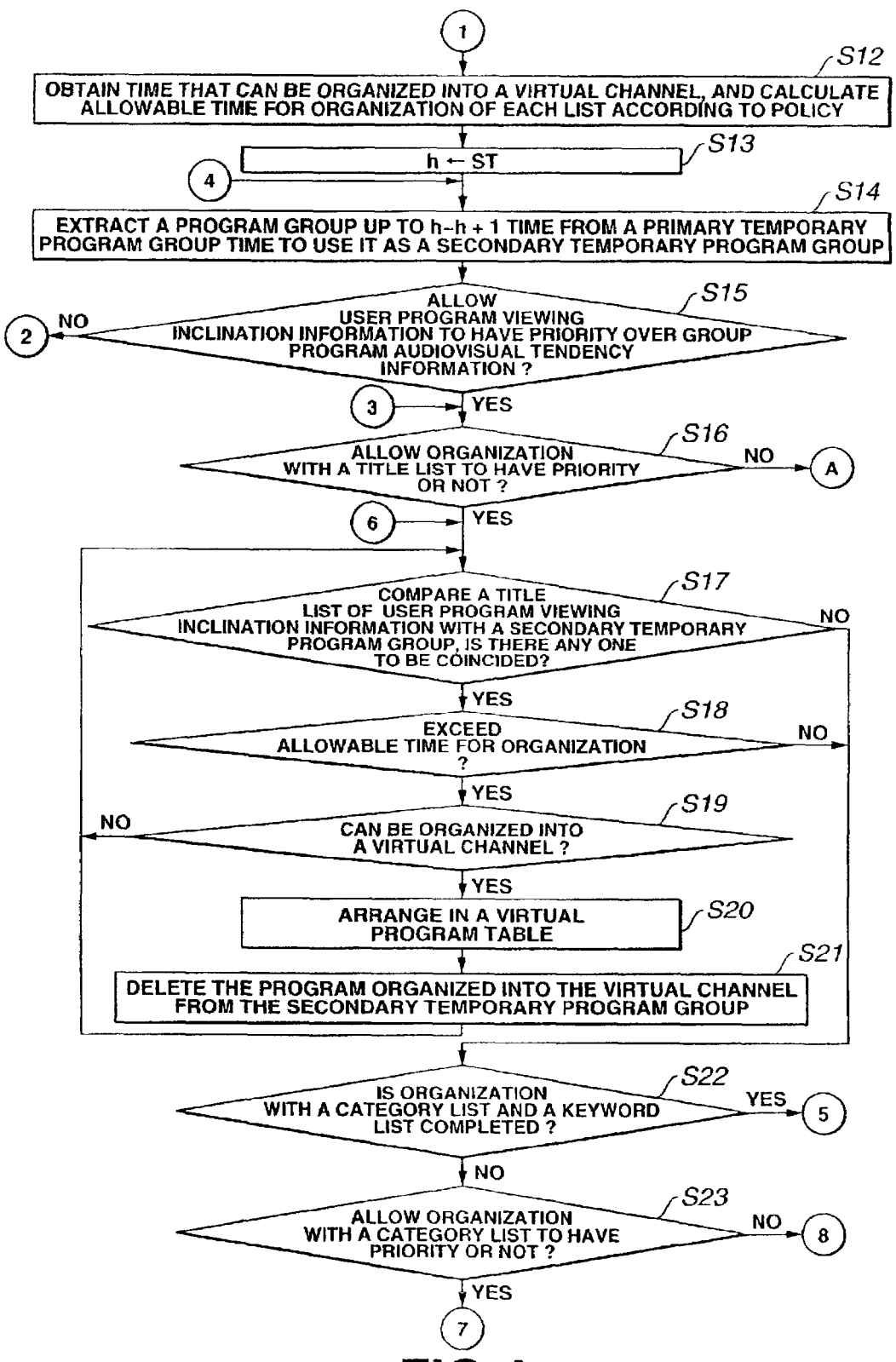
FIG. 4 is a second flow chart for explaining the operation for producing a virtual program table in the virtual program table presenting system.

The keyword list shown in Table 14 has information of a day of the week on which program was broadcast, program start time, a keyword of program, and values. The keyword of program will be explained. The keyword of program is, for example, a person's name as shown in FIG. 4, the person's name showing a person appeared on the program. The keyword is, for example, a performer appeared every time on the program or a guest performer featurizing the program. For example, the keyword of the highest value in the keyword list of Table 14 is a keyword "Funaki ◎◎", whose value is 5.

A value of each list is calculated from viewing histories of all users belonging to each group, and is renewed every predetermined period.

A title list, a category list, and a keyword list of GFri 21 are shown in Table 15, Table 16, and Table 17, respectively; and a title list, a category list, and a keyword list of GFri 22 are shown in Table 18, Table 19, and Table 20, respectively.

TABLE 15

Title List

| Day | Time | Title | Value |
|---|---|---|---|
| Fri. | 21:00:00 | ◎◎ Foreign film theater | 9 |
| Fri. | 21:00:00 | Friday drama ◎◎ | 6 |
| Fri. | 21:00:00 | □□Mother Nature | 4 |

TABLE 16

Category List

| Day | Time | Category | Value |
|---|---|---|---|
| Fri. | 21:00:00 | Foreign film(0) | 9 |
| Fri. | 21:00:00 | Drama/play(5) | 6 |
| Fri. | 21:00:00 | Education/documentary(A) | 5 |

TABLE 17

Keyword List

| Day | Time | Keyword | Value |
|---|---|---|---|
| Fri. | 21:00:00 | Yokogawa xx | 9 |
| Fri. | 21:00:00 | Tsuchiya ○○ | 5 |
| Fri. | 21:00:00 | Katsura ◎◎◎ | 3 |

TABLE 18

Title List

| Day | Time | Title | Value |
|---|---|---|---|
| Fri. | 22:00:00 | LA2NextWeek | 5 |
| Fri. | 22:00:00 | Overseas travel ○○information | 3 |
| Fri. | 22:00:00 | 22○○drama | 1 |

TABLE 19

Category List

| Day | Time | Category | Value |
|---|---|---|---|
| Fri. | 22:00:00 | Drama/play(5) | 5 |
| Fri. | 22:00:00 | Leisure/hobby(8) | 4 |
| Fri. | 22:00:00 | News/report(6) | 2 |

TABLE 20

Keyword List

| Day | Time | Keyword | Value |
|---|---|---|---|
| Fri. | 22:00:00 | George ◎◎ | 5 |
| Fri. | 22:00:00 | Yamaguchi ○○ | 4 |
| Fri. | 22:00:00 | Kimura xx | 3 |

The user program viewing inclination information and the group program viewing inclination information also rely on evaluation of a program by a user in addition to that is produced on the basis of program viewing histories of a user accumulated in the data base 12 as described above. In a case where judgment is made that a program viewed by a user is preferable, its evaluation is reflected on the user program viewing inclination information and the group program viewing inclination information, and values of a title, a category, and a keyword of the applied program are incremented.

For example, a button is arranged for inputting user's program evaluation described as "Good" in program information columns of a virtual program table produced by the virtual program table producing apparatus 2. In a case where after a user has viewed a program of a virtual program table, judgment is made that the viewed program is preferable, a "Good" button is checked through the terminal device 3, values of a title, a category, and a keyword of the user program viewing inclination information and the group program viewing inclination information are incremented, the user's program evaluation is reflected on the program viewing inclination information and the group program viewing inclination information.

The control unit 15 controls in blanket the data base 11, the data base 12, the data base 13, and the data base 14 to produce a virtual program table to transmit it to the terminal device 3.

The terminal device 3 is, for example, a personal computer, which is provided with a display unit for receiving a virtual program table transmitted from the virtual program table producing apparatus 2 to output and display the received virtual program table, for example, a CRT (Cathode Ray Tube), a liquid crystal display or the like. Further, the terminal device 3 is provided with an input unit for inputting individual information or change information of the received program table, for example, a keyboard or a mouse, and transmits the input individual information to the virtual program table producing apparatus 2.

Subsequently, the operation for producing a virtual program table by the virtual program table presenting system 1 will be explained with reference to the flow charts shown in FIGS. 3~11.

Figure 3:
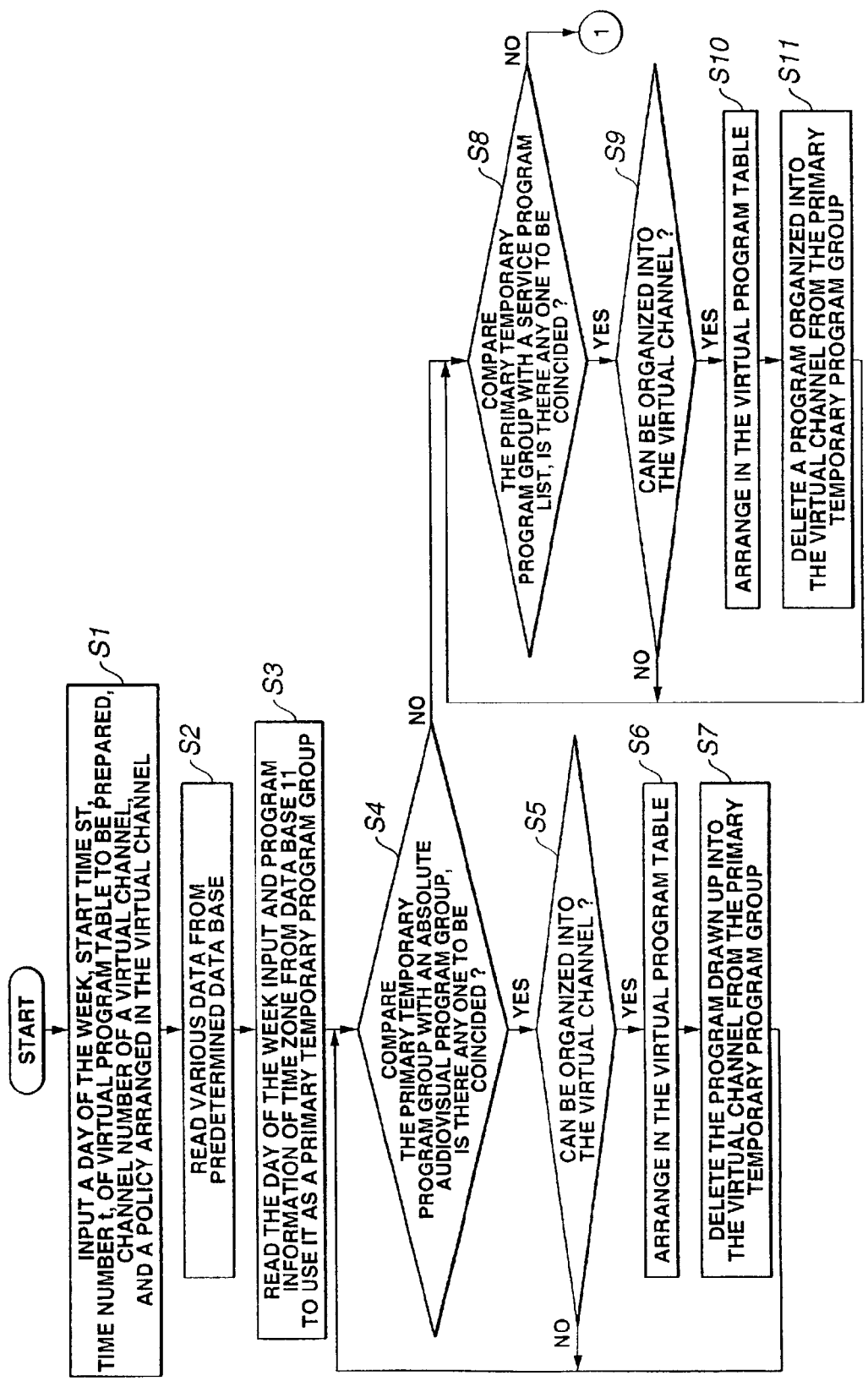
FIG. 3 is a first flow chart for explaining the operation for producing a virtual program table in the virtual program table presenting system.

The steps from Step 1 to Step 11 are shown in FIG. 3.

In Step S1, the user inputs a day of the week of a virtual program table desired to be prepared, start time ST of a virtual program table, and time number t from the terminal device.

Further, in a case where the channel number of a virtual channel produced is not decided previously and can be set by inputting of the user, the channel number of a virtual channel is also input. Furthermore, the channel number of a virtual channel may be calculated by previously setting only the upper limit of the virtual channel number that can be produced, and multiplying the real channel number that can be used by the user by the coefficient. For example, let Vmax be the upper limit of the virtual channel number, Rc be the real channel number, Vc be the virtual channel number, and k be the coefficient, then the virtual channel Vc is calculated by Vc=k×Rc. If the calculated Vc is Vc≧Vmax, Vc=Vmax results.

For example, in Step S1, the user who desires to prepare a virtual program table is a user X, and a day of the week and time of a virtual program table prepared are respectively 20 to 23 of Friday. Further, the virtual channel number produced can be input by the user, and the virtual channel number is 4 and channels are expressed by VC-1, VC-2, VC-3, and VC-4.

Then, the user inputs, from the terminal device, a policy value for deciding the priority order of user program viewing inclination information and group program viewing inclination information, and the priority order of a title list, a category list and a keyword list of user program viewing inclination information and group program viewing inclination information.

The policy value has a time number mode for prescribing the employing rate with respect to the total time number calculated by multiplying the virtual channel number produced by the time number, and a program number mode for prescribing the employing rate with respect to the program number organized into the virtual channel.

First, the time number mode will be explained. In the time number mode, the policy value is input such that for example, user program viewing inclination information is 70%, and group program viewing inclination information is 30%. This numerical value means that a program corresponding to the time number of 70% of the total time number calculated by multiplying the channel number of the virtual channel produced by the time number is organized into the virtual channel on the basis of user program viewing inclination information, and a program corresponding to the time number of 30% is organized into the virtual channel on the basis of group program viewing inclination information.

For example, suppose that the total time number calculated by multiplying the virtual channel number produced by the time time is 100 hours, then broadcasting time of a program that can be organized using user program viewing inclination information is 70 hours in total, and broadcasting time of a program that can be organized using group program viewing inclination information is 30 hours in total.

Similarly, it is supposed that the policy values of a title list, a category list, and a keyword list of user program viewing inclination information and group program viewing inclination information are 50%, 30%, and 20%, respectively. Since as descried above, in a case of using user program viewing inclination information, programs that can be arranged are 70 hours in total, programs for 35 hours on the basis of the title list, 21 hours on the basis of the category list, and 14 hours on the basis of the keyword list are selected.

The case of group program viewing inclination information is also similar to that of user program viewing inclination information.

Further, when programs are organized into the virtual channel, programs are organized in order of higher policy. In the case of the aforementioned policy values, first, the title list of user program viewing inclination information is used preferentially, then the category list, and the keyword list. Organizing of the program by user program viewing inclination information is ended, a title list, a category list, and a keyword list of group program viewing inclination information come this time. It is noted that with respect to the policy value, a suitable value can be input, but a fraction sometimes appears depending on a combination of time capable of arranging a virtual channel and broadcasting time of a program. In such as a case, a program is selected so as to be nearest to each policy value.

Subsequently, the program number mode will be explained. In the program number mode, as the program number to be a reference when the employing rate is prescribed by the program number, the program number that can be organized into the virtual channel is set. For example, suppose that one program can be organized into each virtual channel per hour, then in a case where a program is organized into a virtual channel on the basis of user program viewing inclination information and group program viewing inclination information in unit of one hour, the channel number serves to be a reference. For example, if virtual channels produced are 20, the program number as a reference is 20.

In the program number mode, for example, the policy number is input such that user program viewing inclination information is 70% and group program viewing inclination information is 30%, similar to the time number mode.

This numerical value means that 70% of the program number as a reference are programs selected on the basis of user program viewing inclination information, and 30% thereof are programs selected on the basis of group program viewing inclination information. For example, suppose that the number of virtual channels produced is 20, programs that can be organized using user program viewing inclination information are 20×0.7=14, and programs that can be organized using group program viewing inclination information are 20×0.3=6.

Similarly, suppose that policy values of a title list, a category list, and a keyword list of user program viewing inclination information and group program viewing inclination information are 50%, 30%, and 20%, respectively. As described above, in a case where user program viewing inclination information is used, since programs that can be organized are 14, programs of 14×0.5=7 on the basis of a title list, programs of 14×0.3=4.2 on the basis of a category list, and programs of 14×0.2=2.8 on the basis of a keyword list are selected. Hereupon, in a case where fractions appear as in the program number of programs selected on the basis of the category list and the keyword list, the program number is corrected so as to be nearest to each policy value. For example, correction is made so as to be 4 in the category list, and 3 in the keyword list. Further, in the program number mode, in a case where even if processing explained above is executed, an adequate vacant region for organizing programs is present in a virtual channel, the same step is repeated again to organize into a virtual channel.

Also in the case of group program viewing inclination information, the steps explained above are executed to organize into a virtual channel similarly to the case of user program viewing inclination information.

Further, when programs are organized into a virtual channel in the program number mode, programs are organized in order of higher policy similar to the time number mode. In the case of the aforementioned policy value, first, a title list of user program viewing inclination information is used preferentially, and then a category list and a keyword list are used. When organizing of programs by user program viewing inclination information is ended, then a title list, a category list, and a keyword list of group program viewing inclination information are to be used.

In Step S2, the control unit 15 of the virtual program table producing apparatus 2 reads, according to the input from the terminal device 3, user program viewing inclination information of a user X from the data base 12, an absolute viewing program group from the data base 13, and group program viewing inclination information of a group to which the user X belongs, a group A here, from the data base 13. Since the virtual program table desired by the user X is a virtual program table from 20 to 23 on Friday, Fri 20 shown in Tables 3 to 5, Fri 21 shown in Tables 6 to 8, and Fri 22 shown in Tables 9 to 11 out of user program viewing inclination information; and GFri 20 shown in Tables 12 to 14, GFri 21 shown in Tables 15 to 17, and GFri 22 shown in Tables 18 to 20 out of group program viewing inclination information are read.

In Step S3, the control unit 15 reads applied all program information of a time zone preparing a virtual program table from the data base 11, and they forms one program group. Here, program information from 20 to 23 on Friday are taken out. In a case where program information is, for example, as in the above Table 1, a program in which broadcasting of a program starts after 20 and ens within 23 is extracted with reference to the Start Time column and the Time column in the Table.

In Table 1, "quiz ◎ ◎" whose Start Time is 19:30:00, "French movie ◎ ◎" whose program end time succeeds 23 because Start Time is 22:00:00 and Time is 2:00:00, "Soccer Time NOSO" whose Start Time is 23:00:00, "Music☐", and "Cook ◎ ◎" are excluded, program information of other programs are arranged as a program group. The thus arranged program group is called hereupon as a primary temporary program group. The primary temporary program group is shown in Table 1.

TABLE 21

Primary Temporary Program Group

| Date | Day | Start Time | Time | Title | Cate. | Keyword |
|---|---|---|---|---|---|---|
| 2000.09.01 | Fri. | 20:00:00 | 0:30:00 | News/stock price commentary | 7 | Sato○○ |
| 2000.09.01 | Fri. | 20:00:00 | 0:30:00 | ○○News | 6 | Nakamura○○ |
| 2000.09.01 | Fri. | 20:00:00 | 0:30:00 | xxMusic | 4 | Kitayama xx |
| 2000.09.01 | Fri. | 20:00:00 | 2:00:00 | △△ Japanese film theater | 1 | Yamada ◎ ◎ |
| 2000.09.01 | Fri. | 20:00:00 | 1:00:00 | xx Quiz | 7 | Maeda xx |
| 2000.09.01 | Fri. | 20:00:00 | 1:00:00 | ◎ ◎ Count Down | 4 | Kitagawa○○ |
| 2000.09.01 | Fri. | 20:00:00 | 0:30:00 | △△Fishing xx | 8 | Suzuki △△ |
| 2000.09.01 | Fri. | 20:00:00 | 1:00:00 | △△Challenge | 7 | Takada xx |
| 2000.09.01 | Fri. | 20:00:00 | 1:00:00 | ○○ Feature | A | Murakami☐ |
| 2000.09.01 | Fri. | 20:00:00 | 1:00:00 | xxPro-wres | 3 | Funaki ◎ ◎ |
| 2000.09.01 | Fri. | 20:30:00 | 0:30:00 | ◎ ◎ Introduction | 9 | Hara △△ |
| 2000.09.01 | Fri. | 20:30:00 | 0:30:00 | News & sports ◎ ◎ | 6 | Harada ◎ ◎ |
| 2000.09.01 | Fri. | 20:30:00 | 0:30:00 | Olympic☐☐ | 3 | Takahashi △△ |
| 2000.09.01 | Fri. | 20:30:00 | 0:30:00 | ○○Sience | A | Suzuki ◎ ◎ |
| 2000.09.01 | Fri. | 21:00:00 | 1:00:00 | ☐☐Mother Nature | A | Sakamoto○○ |
| 2000.09.01 | Fri. | 21:00:00 | 1:00:00 | Friday drama ◎ ◎ | 5 | Katsura ◎ ◎ ◎ |
| 2000.09.01 | Fri. | 21:00:00 | 1:00:00 | Lelics◎ ◎ exploration | B | Shima○○ |
| 2000.09.01 | Fri. | 21:00:00 | 1:00:00 | New car information xxfeature | 8 | Matsubayashi ☐☐ |
| 2000.09.01 | Fri. | 21:00:00 | 1:00:00 | World ○○soccer | 2 | Tanaka △△ |
| 2000.09.01 | Fri. | 21:00:00 | 0:30:00 | Sword of ◎ ◎ | 9 | Murata ◎ ◎ |
| 2000.09.01 | Fri. | 21:00:00 | 2:00:00 | ◎ ◎ Foreign film theatre | 0 | Yodogawa xx |
| 2000.09.01 | Fri. | 21:00:00 | 1:00:00 | △△Theater | 5 | Inagaki ◎ ◎ |
| 2000.09.01 | Fri. | 21:00:00 | 2:00:00 | ○○Theater | 0 | Tsuchiya○○ |
| 2000.09.01 | Fri. | 21:30:00 | 0:30:00 | xx 2/4 | 9 | Ikeda☐☐ |
| 2000.09.01 | Fri. | 22.00.00 | 1:00:00 | Overseas Travel ○○information | 8 | Inoue○○ |
| 2000.09.01 | Fri. | 22:00:00 | 0:30:00 | Digital video ○○ % | 8 | Yamashita xx |
| 2000.09.01 | Fri. | 22:00:00 | 1:00:00 | ◎ ◎ of yesterday | 5 | Mikami △△ |
| 2000.09.01 | Fri. | 22:00:00 | 1:00:00 | NY○○ | 5 | Kimura xx |
| 2000.09.01 | Fri. | 22:00:00 | 1:00:00 | 22○○drama | 5 | Yamaguchi○○ |
| 2000.09.01 | Fri. | 22:00:00 | 1:00:00 | LA2NextWeek | 5 | George ◎ ◎ |
| 2000.09.01 | Fri. | 22:00:00 | 0:30:00 | Bowling △△ | 8 | Nishida △△ |

TABLE 21-continued

Primary Temporary Program Group

| Date | Day | Start Time | Time | Title | Cate. | Keyword |
|---|---|---|---|---|---|---|
| 2000.09.01 | Fri. | 22:30:00 | 0:30:00 | News○○ | 6 | Yamamura ☺ ☺ |
| 2000.09.01 | Fri. | 22:30:00 | 0:30:00 | Cute Angel Kent | 0 | Kent □□ |

In Step S4, the control unit 15 compares the primary temporary program group with program information of an absolute viewing program group of the user X read from the data base 13 to search one coincided. In a case where the applied program is present, its program information is read, and the procedure proceeds to Step S5; and in a case where the applied program is not present, the procedure proceeds to Step S8.

Table 22 shows one example of the an absolute viewing program group of the user X.

TABLE 22

Absolute Viewing Program Group

| Date | Day | Start Time | Time | Title | Cate. | Keyword |
|---|---|---|---|---|---|---|
| 2000.09.01 | Fri. | 20:30:00 | 0:30:00 | ○○Science | A | Suzuki○○ |
| 2000.09.01 | Fri. | 20:30:00 | 0:30:00 | Cute Angel Kent | 0 | Kent □□ |

For example, first, the control unit 15 compares "○○Science" in which Start Time is earliest, 20:30:00 in the absolute viewing program group shown in Table 22 with the primary temporary program group shown in Table 21 to search if one coincided is present. When the control unit 15 finds "○○Science" in the primary temporary program group of Table 21, the control unit 15 reads its program information, and here, the procedure proceeds to Step 5.

In Step S5, the control unit 15 calculates a vacant region of a virtual channel to compare it with broadcasting time of a program obtained form program information read in Step S4 to thereby judge if organizing a program into a virtual channel is enabled. If the control unit 15 judges that organizing a program is enabled, the step is caused to proceed to Step S6; if judges that organizing is disabled, the step returns to Step S4.

For example, suppose that any program is not yet organized in a virtual channel, the control unit 15 calculates a vacant region of a virtual channel as four channels×3 hours=12 hours. Further, since the broadcasting time number of "○○Science" having read program information in Step S4 is 30 minutes, the control unit 15 judges that "○○ Sience" can be organized into any channel of VC-1 to VC-4 of a virtual channel to proceed the step to Step S6.

In Step 6, the control unit 15 organizes a program into a virtual channel, and arranges program information to a virtual program table. The organized programs are organized in order of younger virtual channel numbers. For example, suppose that four virtual channels are VC-1, VC-2, VC-3, and VC-4, then a program is arranged from VC-1.

For example, since a program is not yet organized into a virtual channel, the control unit 15 organizes "○○ Sience" in which Start Time is 20:30:00 into 20:30 of VC-1, and arranges its program information in a virtual program table.

In Step S7, the control unit 15 deletes program information of a program organized into a virtual channel in Step S6 out of the primary temporary program group. For example, program information of "○○ Sicence" of the primary temporary program group shown in Table 21 is deleted.

When Step S7 is ended, the step returns to Step S4. Since "Cute angel Kent" in which Start Time is 22:30:00 is present in the absolute viewing program group shown in Table 22 and this program can be also organized into a virtual channel, the control unit 15 organizes this program at 22:30 of VC-1, and arranges program information in a virtual program table.

In Step S8, the control unit 15 compares a primary temporary program group with a mediation program list of the third party accumulated in an accumulation unit not shown to search one coincided. In a case where the applied program is not present, the step proceeds to Sep S12 in FIG. 4.

The mediation program list of the third party will be explained. The mediation program list of the third party is a list which gathers program information of programs selected by a person or a party different from the user X, for example, such as a server manager, an advertiser or the like. The server manager intrudes a program for publicity selected by the server manager into a virtual channel with or without permission of the user X. In a case where the server manager poses money on the user X every time a virtual channel is prepared, the server manager reduces the fee of money posed as a consideration for advertizing programs for publicity on the user X. Further, in a case where programs selected by an advertiser are arranged in a virtual channel, for example, programs in which the advertiser takes up the goods desired to be advertized or programs in which commercials for the goods are inserted are arranged. The advertiser pays a part or the whole of a virtual service utilizing price to be paid by the user X to the server manager as a consideration for which the advertiser arranges programs in a virtual channel with or without permission of the user X. The mediation program list of the third party is a program group in which an intention of the third party is included as mentioned above. These programs often have nothing to do with the user's taste, but publicity programs related to the taste of a user or a group can be also selected.

For example, suppose that the control unit 15 compares the mediation program list of th the third party with the primary temporary program group shown in Table 21 to obtain "Digital video ○○% practical use" in which Start Time is 22:00:00 as a search result. The control unit 15 reads program information of this program.

The third party for arranging this program on the virtual channel of the user X is, for example, a maker for preparing and selling a digital video camera or a digital video deck.

In Step S9, the control unit 15 calculates a vacant region of a virtual channel and compares it with broadcasting time of a program obtained from the program information read in Step S8 to thereby judge if a program can be organized into a virtual channel. The control unit 15, it is made that the program can be organized, causes the step to proceed to Step S10, and, if judgment is made that the program cannot be organized, causes the step to return to Step S8 in FIG. 4.

In Step S10, the control unit 15 organizes a program into a virtual channel, and arranges its program information to a virtual program table. The control unit 15 organizes programs in order of younger channel numbers of the virtual channel.

For example, "Digital video OO% practical use" in which Start Time is 22:00:00 is organized at a position of 22 of VC-1, and its program information is arranged the virtual program table as shown by the diagonal line in FIG. 12. For example, when an "explanation" button descried in a program information column of each program in the virtual program table shown in FIG. 12 is checked, a browser starts and an explanation sentence in which contents of the applied program are arranged is displayed.

In Step S11, the control unit 15 deletes program information of a program organized into a virtual channel in Step S10 out of the primary temporary program group. For example, program information of "Digital video OO% practical use" of the primary temporary program group shown in Table 21 is deleted.

When Step S11 ends, the step returns to Step S8.

The steps from Step S12 to Step S23 are shown in FIG. 4.

In Step S12, the control unit 15 obtains the time number that can be organized into a virtual channel of a virtual program table prepared, and calculates organizing permissible time to be the upper limit when organizing is made on the basis of user program viewing inclination information and group program viewing inclination information from the policy value input by the user X in Step S1.

For example, in a case where virtual channels are four channels, and a virtual program table in which a time zone is 3 hours from 20 to 23 is prepared, the virtual channels have growing-up permissible time of 4 (channels)×3 (hours)×60 (minutes). Suppose that "OO Sience" of a 30-minute program, "Digital video OO% practical use" of a 30-minute program, and "Cute angel Kent" of a 30-minute program are organized into VC-1, then organizing permissible time of a virtual program table is 720−30×3=630 minutes.

Suppose that policy values of user program viewing inclination information and group program viewing inclination information are 70% and 30%, respectively, then organizing permissible time are 630×(7/10)=441 minutes and 630×(3/10)= 189 minutes, respectively. The organizing permissible time means that the time number of a program capable of being arranged in a virtual channel on the basis of user program viewing inclination information is 441 minutes at the maximum, and he time number of a program capable of being arranged in a virtual channel on the basis of group program viewing inclination information is 189 minutes at the maximum.

Further, suppose that policy values of a title list, a category list, and a keyword list of user program viewing inclination information and group program viewing inclination information are 50%, 30%, and 20%, respectively, organizing permissible time in a case of user program viewing inclination information are 441×(5/10)=220.5 minutes, 441×(3/10)=132.3 minutes, and 441×(2/10)=88.2 minutes, respectively; and in a case of group program viewing inclination information are 189×(5/10)=94.5 minutes, 189×(3/10)=56.7 minutes, and 189× (2/10)=37.8 minutes. However, since each program is normally composed in a unit of 120 minutes, 60 minutes, and 30 minutes, if organizing permissible time is made to be an integral multiple of broadcasting time of a program, waste can be avoided so that user program viewing inclination information and group program viewing inclination information can be further reflected on the organizing work of a virtual channel.

For example, when organizing permissible time by a title list, a category list and a keyword list calculated as described above are corrected so as to be an integral multiple of 30 minutes since shortest broadcasting time out of programs belonging to the primary temporary program group, they are 240 minutes, 120 minutes, and 90 minutes, respectively, in a case of user program viewing inclination information. Likewise, in a case of group program viewing inclination information, they are 90 minutes, 60 minutes, and 30 minutes, respectively.

In Step S12 and the following steps, a time number mode for prescribing the employing rate with respect to the total time number calculated by multiplying the virtual channel number produced by time is applied. Further, in Step S12, time that can be organized into a virtual channel is obtained to calculate organizing permissible time of the respective lists according to policy values, but there can be also applied a program number mode for calculating the program number that can be organized into a virtual channel according to policy values in Step S12 and prescribing the employing rate with respect to the program number organized into a virtual channel in the following steps.

For example, suppose that the channel number of virtual channels produced is 4, and a time zone of virtual channels produced is 3 hours from 20 to 23, the program number to be a reference when the employing rate is prescribed by the program number are respectively four every time. Further, suppose that policy values of user program viewing inclination information and group program viewing inclination information are 70% and 30%, respectively, programs of 4×0.7=2.8 and 4×0.3=1.2 are organized into virtual channels by user program viewing inclination information and group program viewing inclination information, respectively. It is noted that the calculated values are corrected to three and one in user program viewing inclination information and group program viewing inclination information, respectively, so as to be nearest to the policy values.

Then, suppose that policy values of a title list, a category list, and a keyword list are 50%, 30% and 20%, respectively, 3×0.5=1, 3×0.3=0.9, and 3×0.2=0.6 result in a title list, a category list, and a keyword list, respectively, of user program viewing inclination information. The calculated values are corrected, for example, such as one in a title list, one in a category list, one in a keyword list or two in a title list, one in a category list, and zero (0) in a keyword list, and the program number according to the policy values are calculated.

Further, in a case of group program viewing inclination information, since only one program number is assigned, the title list in which the policy value is highest takes preference, and in later step, organizing into a virtual channel based on the title list is executed.

In the following steps, as described above, the program number mode may be applied in place of the time number mode to organize a program into a virtual channel, and further, the time number mode and the program number mode may be combined to organize a program into a virtual channel. At that time, in Step S12, organizing permissible time of the time number mode and the reference program number of the program number mode are respectively calculated.

In Step S13, the control unit 15 replaces start time ST of a virtual program table produced by h. This operation is an operation for carrying out a loop described later in flow charts shown in FIGS. 3 to 11. For example, suppose that start time ST input in Step S1 is ST=20, h=20 results.

In Step S14, the control unit 15 extracts a program of one hour from h to h+1 from the primary temporary program group obtained in Step S3 to provide a secondary temporary program group.

For example, when h equals to 20 (h=20), the control unit 15 extracts a program group of programs belonging to 20 to 21 out of the primary temporary program group to provide a secondary temporary program group. A secondary temporary program group from 20 to 21 of the primary temporary program group shown in Table 21 is shown in Table 23.

TABLE 23

Secondary Temporary Program Group

| Date | Day | Start Time | Time | Title | Cate. | Keyword |
|------|-----|------------|------|-------|-------|---------|
| 2000.09.01 | Fri. | 20:00:00 | 0:30:00 | News/stock price commentary | 6 | Sato○○ |
| 2000.09.01 | Fri. | 20:00:00 | 0:30:00 | ○○News | 6 | Nakamura○○ |
| 2000.09.01 | Fri. | 20:00:00 | 0:30:00 | xxMusic | 4 | Kitayama xx |
| 2000.09.01 | Fri. | 20:00:00 | 2:00:00 | ΔΔ Japanese film theater | 1 | Yamada ◎◎ |
| 2000.09.01 | Fri. | 20:00:00 | 1:00:00 | xx Quiz | 7 | Maeda xx |
| 2000.09.01 | Fri. | 20:00:00 | 1:00:00 | ◎◎ Count Down | 4 | Kitagawa○○ |
| 2000.09.01 | Fri. | 20:00:00 | 0:30:00 | ΔΔFishing xx | 8 | Suzuki ΔΔ |
| 2000.09.01 | Fri. | 20:00:00 | 1:00:00 | ΔΔChallenge | 7 | Takada xx |
| 2000.09.01 | Fri. | 20:00:00 | 1:00:00 | ○○ Feature | A | Murakami□ |
| 2000.09.01 | Fri. | 20:00:00 | 1:00:00 | xxPro-wres | 3 | Funaki ◎◎ |
| 2000.09.01 | Fri. | 20.30:00 | 0:30:00 | ◎◎Introduction | 9 | Hara ΔΔ |
| 2000.09.01 | Fri. | 20:30:00 | 0:30:00 | News & sports ◎◎ | 6 | Harada ◎◎ |
| 2000.09.01 | Fri. | 20:30:00 | 0:30:00 | Olympic□□ | 3 | Takahashi ΔΔ |

When the secondary temporary program group is extracted from the primary temporary program group, for example, in the program which starts broadcasting from 21 and in which broadcasting time is two hours as in "◎◎ Foreign film theater", program start time is a reference for classification. Accordingly, "◎◎ Foreign film theater" is classified into the secondary temporary program group of 21~22.

In Step S15, the control unit 15 judges, when a program is organized into a virtual channel on the basis of user program viewing inclination information and group program viewing inclination information, if user program viewing inclination information causes to take preference over group program viewing inclination information. The control unit 15 proceeds the step to Step S16 when the user program viewing inclination information takes preference, and to Step S42 in FIG. 8 when not to take preference. The preference of user program viewing inclination information and group program viewing inclination information is decided by the policy value input in Step S1, and the higher policy value takes preference.

For example, suppose that policy values of user program viewing inclination information and group program viewing inclination information are 70% and 30%, respectively, user program viewing inclination information takes preference, and the control unit 15 proceeds the step to Sep S16.

In Step S16, the control unit 15 judges, when a program is organized into a virtual channel on the basis of a title list, a category list, and a keyword list of user program viewing inclination information, if the title list causes to take preference over the category list and the keyword list. The control unit 15 proceeds the step to Step S17 when the title list takes preference, and to Step S24 in FIG. 5 when not to take preference. The preference of the title list, the category list and the keyword list is decided by the policy value input in Step S1, and the higher policy value takes preference.

For example, suppose that policy values of the title list, the category list and the keyword list are 50%, 30% and 20%, respectively, the title list takes preference, and the control unit 15 proceeds the step to Sep S17.

In Step S17, the control unit 15 compares a program in the title list of user program viewing inclination information with the secondary temporary program group to search one coincided. In a case where the applied program is present, the control unit 15 reads its program information and proceeds to Step S18, and in a case where the applied program is not present, proceeding the step to Step S22.

For example, as a title list for user program viewing inclination information, the title list shown in the above Table 3 is used. Since "News/stock price commentary" which is highest in value in Table 3 is described in the secondary temporary program group shown in Table 23, the control unit 15 reads program information of the program, and proceeds ths step to Step S18.

In Step S18, the control unit 15 judges, in a case where the program which read program information in Step S17 is organized into a virtual channel, if it exceeds draying-up permissible time of the title list calculated in Step S12. More specifically, for example, broadcasting time of the program which read program information is subtracted from permissible arranging time, and if a negative value results, is made that it exceeds organizing permissible time.

In a case where it does not exceed organizing permissible time, the step proceeds to Step S19, and in a case where it exceed s organizing permissible time, the step proceeds to Step S22.

For example, the control unit 15 subtracts, in a case where program information of "News/stock price commentary" is read in Step S18, broadcasting time (30 minutes) of "News/ stock price commentary" from organizing permissible time (240 minutes) of the title list calculated in Step S12. Since the calculated organizing permissible time is left by 210 minutes, the control unit 15 proceeds the step to Step S19.

In Step S19, the control unit 15 calculates a vacant region of a virtual channel to compare it with broadcasting time of a program obtained from program information read in Step S17 to there by judge if a program can be organized into a virtual channel. In a case where the control unit 15 judged that a program can be organized, the step proceeds to Step S20, and in a case of being judged that a program cannot be organized, the step proceeds to Step S22.

For example, in a case where "News/stock price commentary" which is a 30-minute program from 20 is intended to be organized, in the 20 of VC-1 which is lowest in number of the virtual channel, "OO Sience of a 30-minute program from 20:30 is merely arranged. Accordingly, "News/stock price commentary" can be organized into VC-1, and the control unit 15 proceeds the step to Step S20.

In Step S20, the control unit 15 organizes a program to a virtual channel, and arranges its program information in a virtual program table.

Figure 13:
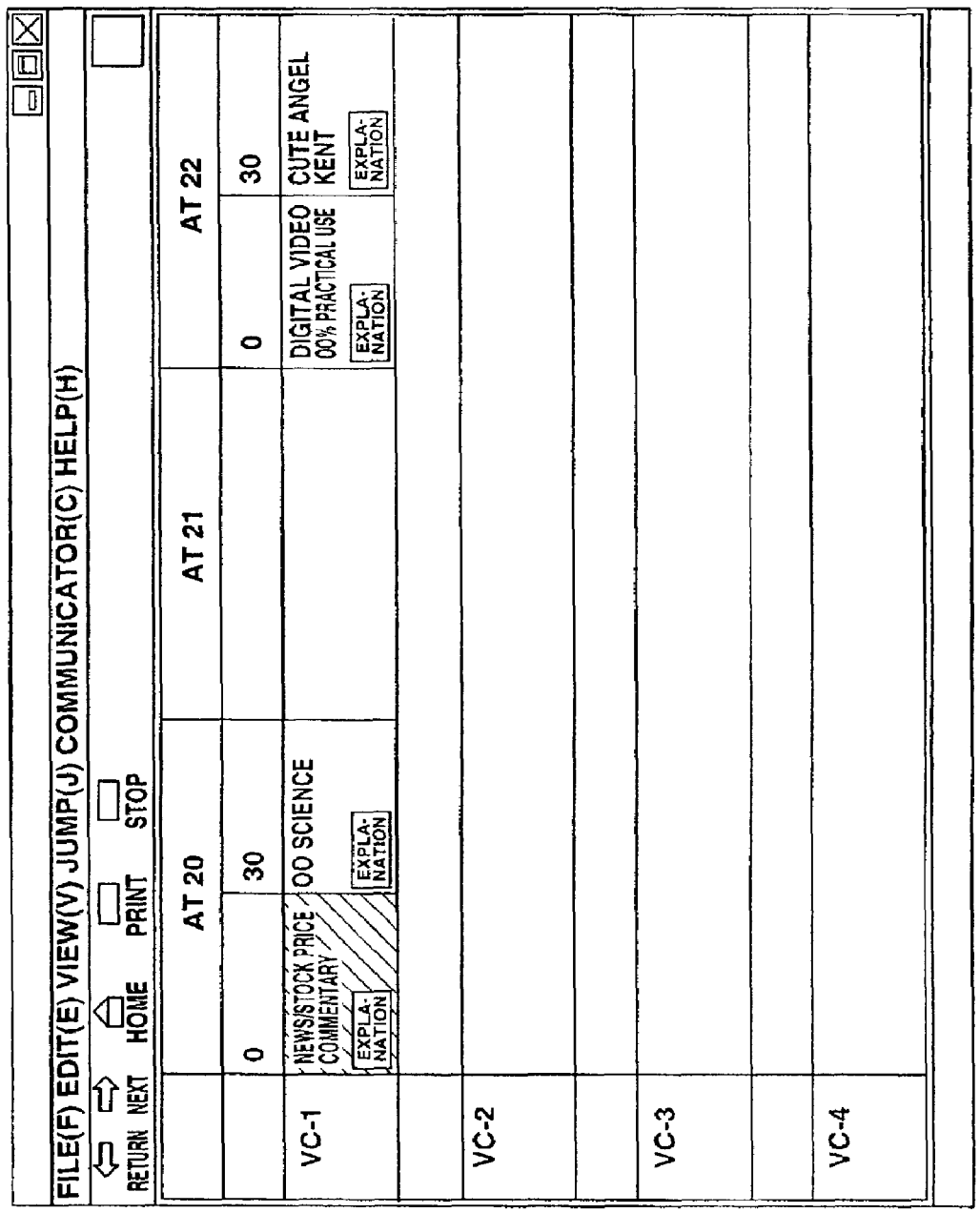
FIG. 13 is a view for explaining the process for arranging program information on a virtual program table in the virtual program table presenting system.

For example, "News/stock price commentary" is organized into VC-1, and is arranged in a virtual program table as shown by the diagonal line in FIG. 13.

In Step S21, the control unit 15 deletes program information of a program organized into a virtual channel in Step S20 from a secondary temporary program group. For example, program information of "News/stock price commentary" of the secondary temporary program group shown in Table 23.

When Step S21 ends, the step returns to Step S17.

The control unit 15 repeats the steps of Step S17~Step S21 from the secondary temporary program group shown in Table 23 and the title list shown in Table 3 to thereby organize "OO News" in which Start Time is 20:00:00 in VC-2, and arranges its program information in a virtual program table. Organizing permissible time of a title list at that time is 190 minutes.

Figure 7:
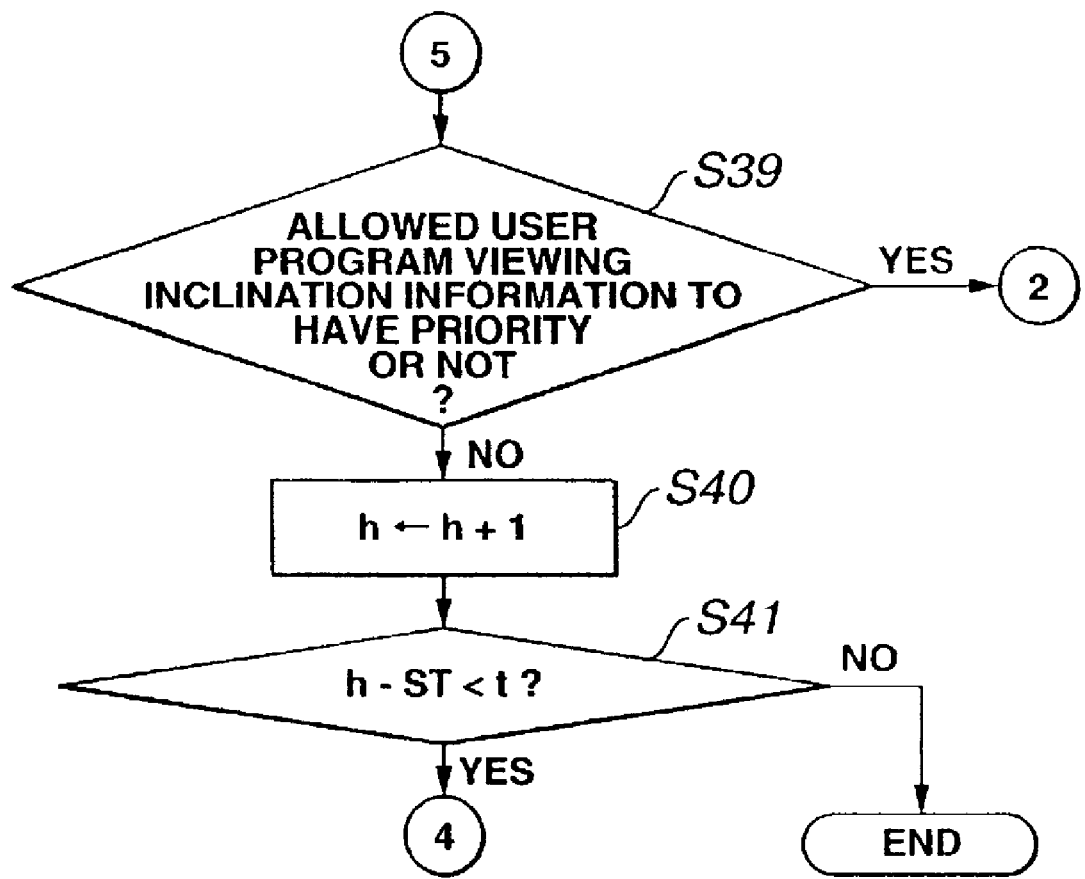
FIG. 7 is a fifth flow chart for explaining the operation for producing a virtual program table in the virtual program table presenting system.

In Step S22, the control unit 15 judges if organizing of programs into virtual channels based on a category list and a keyword list have been completed, and proceeds the step to Step S23 in a case where organizing is not completed, and to Step S39 shown in FIG. 7 in a case of being completed.

tively, the category list takes preference, and the control unit 15 proceeds the step to Step S25.

In a case where arranging of programs to virtual channels based on the category list and the keyword list has been already executed, one not executed is selected. For example, even in a case where a policy value of a category list is 30%, and a policy value of a keyword list is 20% as described above, if a program has been already arranged in a virtual channel on the basis of the category list, this falls under the case where the keyword list takes preference, and the step proceeds to Step S32 shown in FIG. 6.

Figure 5:
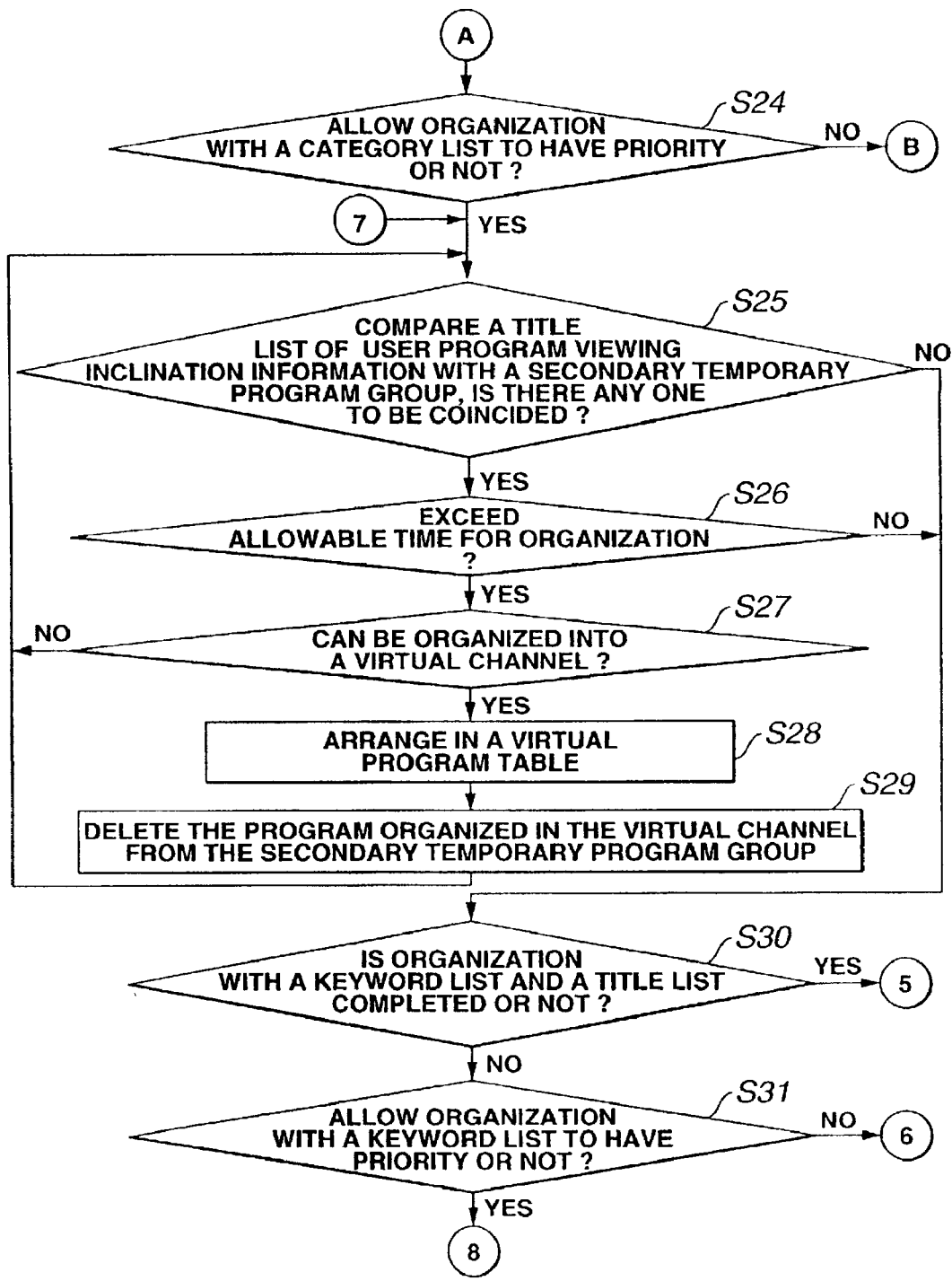
FIG. 5 is a third flow chart for explaining the operation for producing a virtual program table in the virtual program table presenting system.

The steps from Step S24 to Step S31 are shown in FIG. 5.

In Step S24, the control unit 15 judges if organizing of a program into a virtual channel by a category list of user program viewing inclination information takes preference over organizing by a key word list. The control unit 15 proceeds the step to S25 in a case where organizing by a category list takes preference, and to Step S32 shown in FIG. 6 in a case where the keyword list taking preference. Step S24 is executed merely in a case where Step S16 causes organizing of a program into a virtual channel by a title list of user program viewing inclination information to take no preference.

In Step S25, the control unit 15 compares a program in a category list of user program viewing inclination information with a secondary temporary program group to search one coincided. In a case where the applied program is present, program information of the program is read, and the step proceeds to Step S26, whereas in a case where the applied program is not present, the step proceeds to Step S30.

For example, suppose that a category list of user program viewing inclination information is the category list shown in the above Table 4. Further, A secondary temporary program group in a case where program information of a program organized into a virtual channel is deleted from the secondary temporary program group shown in Table 24 in Step S21 is shown in Table 24.

TABLE 24

Secondary Temporary Program Group

| Date | Day | Start Time | Time | Title | Cate. | Keyword |
|---|---|---|---|---|---|---|
| 2000.09.01 | Fri. | 20:00:00 | 0:30:00 | xxMusic | 4 | Kitayama xx |
| 2000.09.01 | Fri. | 20:00:00 | 2:00:00 | ΔΔ Japanese film theater | 1 | Yamada ◎ ◎ |
| 2000.09.01 | Fri. | 20:00:00 | 1:00:00 | xx Quiz | 7 | Maeda xx |
| 2000.09.01 | Fri. | 20:00.00 | 1:00:00 | ◎ ◎ Count Down | 4 | Kitagawa◯◯ |
| 2000.09.01 | Fri. | 20:00:00 | 0:30:00 | ΔΔFishing xx | 8 | Suzuki ΔΔ |
| 2000.09.01 | Fri. | 20:00:00 | 1.00:00 | ΔΔChallenge | 7 | Takada xx |
| 2000.09.01 | Fri. | 20:00:00 | 1.00:00 | ◯◯ Feature | A | Murakami☐ |
| 2000.09.01 | Fri. | 20:00:00 | 1:00:00 | xxPro-wres | 3 | Funaki ◎ ◎ |
| 2000.09.01 | Fri. | 20:30:00 | 0:30:00 | ◎ ◎Introduction | 9 | Hara ΔΔ |
| 2000.09.01 | Fri. | 20:30:00 | 0:30:00 | News & sports ◎ ◎ | 6 | Harada ◎ ◎ |
| 2000.09.01 | Fri. | 20:30:00 | 0:30:00 | Olympic☐☐ | 3 | Takahashi ΔΔ |

In Step S23, the control unit 15 judges if organizing of a program into a virtual channel by a category list of user program viewing inclination information takes preference over organizing by a key word list. The control unit 15 proceeds the step to S25 shown in FIG. 5 in a case where organizing by a category list takes preference, and to Step S32 shown in FIG. 6 in a case of not taking preference.

Preference of a category list and a keyword list is decided by policy values input in Step S1, and the higher policy value takes preference. For example, suppose that policy values of a category list and a keyword list are 30% and 20%, respec- The program classified in category into "News/report" of the category number 6 which is highest in value in Table 4 is "News & Sports ◎ ◎" in which Start Time is 20:30:00 in the secondary temporary list shown in Table 24. The control unit 15 reads program information of the program to proceed the step to S26.

In Step S26, the control unit 15 judges, in a case where the program which read program information in Step S25 is organized into a virtual channel, if it exceeds organizing permissible time of a title list calculated in Step S12. More specifically, for example, broadcasting time of the program which read program information is subtracted from organizing permissible time, and if a negative value results, judgment is made that it exceeds organizing permissible time. In a case of not exceeding organizing permissible time, the step proceeds to Step S27, and in a case of exceeding organizing permissible time, the step proceeds to Step S30.

For example, the control unit 15 subtracts, in a case where program information of "News & Sports ⊚⊚" in Step S25, broadcasting time (30 minutes) of "News & Sports ⊚⊚" from organizing permissible time (120 minutes) of a category list calculated in Step S12. Since the calculated organizing permissible time is left by 90 minutes, the control unit 15 proceeds the step to Step S27.

In Step S27, the control unit 15 calculates a vacant region of a virtual channel to compare it with broadcasting time of a program obtained from program information read in Step S25 to thereby judge if a program can be organized into a virtual channel. The control unit proceeds the step to Step 28 in a case where is made that a program can be organized, and returns the step to Step S25 in a case where judgment is made that organizing is disabled.

For example, in a case where "News & Sports ⊚⊚" which is a 30-minute program from 20:30 is intended to be organized into a virtual channel, in the 20 of VC-1 which is the lowest number of a virtual channel, "News/stock price commentary" from 20 and "OO Science" of a 30-minute program form 20:30 are arranged, and therefore arrangement is disabled. Since "News/stock price commentary" which is a 30-minute program from 20 is merely arranged in VC-2, arrangement in VC-2 is enabled. Accordingly, the control unit 15 proceeds the step to Step S28.

In Step S28, the control unit 15 organizes a program into a virtual channel, and arranges its program information in a virtual program table.

For example, "News & Sports ⊚⊚" is organized into VC-2, and program information is arranged as shown by the diagonal line of FIG. 14.

In Step S29, the control unit 15 deletes program information of a program organized into a virtual channel in Step S28 form a secondary temporary program group. For example, program information of "News & Sports ⊚⊚" of the secondary temporary program group shown in Table 24 is deleted.

When Step S29 ends, the step returns to Step S25.

The control unit 15 repeats the steps of Step S25~Step S29 from the secondary temporary program group shown in Table 24 and the category list shown in Table 4 to thereby organize "OO Feature" n which Start Time is 20:00:00 selected on the basis of "Education/documentary" of category number A in VC-3 into "xx Music" in which Start Time is 20:00:00 selected on the basis of "Music" of category number 4 in VC-4, and arranges respective program information in a virtual program table as shown by the diagonal line of FIG. 15. Organizing permissible time of a category list at that time is 0 minute.

In Step 30, the control unit 15 judges if organizing of programs into virtual channels based on the keyword list and the title list has been completed, and in a case where organizing is not completed, the step proceeds to Step S31, and in a case of being completed, the step proceeds to Step S39 shown in FIG.7.

In Step S31, the control unit 15 judges if organizing of a program into a virtual channel by a keyword list of user program viewing inclination information takes preference over organizing by a title list. The control unit 15 proceeds the step to Step S32 shown in FIG. 6 in a case where organizing by a keyword list takes preference, and to Step S17 shown in FIG. 4 in a case of taking no preference.

The preference of the keyword list and the title list is decided by policy values input in Step S1, and the higher policy value takes preference. For example, suppose that policy values of the keyword list and the title list are 20% and 50%, respectively, then the title list takes preference, and the control unit 15 proceeds the step to Step S17 shown in FIG. 4.

In a case where arrangement of a program in a virtual channel based on the keyword list or the title list has been already executed, one not executed is selected. For example, even a case where as described above, the policy value of the title list is 50%, and the policy value of the keyword list is 30%, if a program has been already arranged in a virtual channel on the basis of the title list, this falls under the case where the keyword list takes preference, and the step proceeds to Step S32 shown in FIG. 6.

Figure 6:
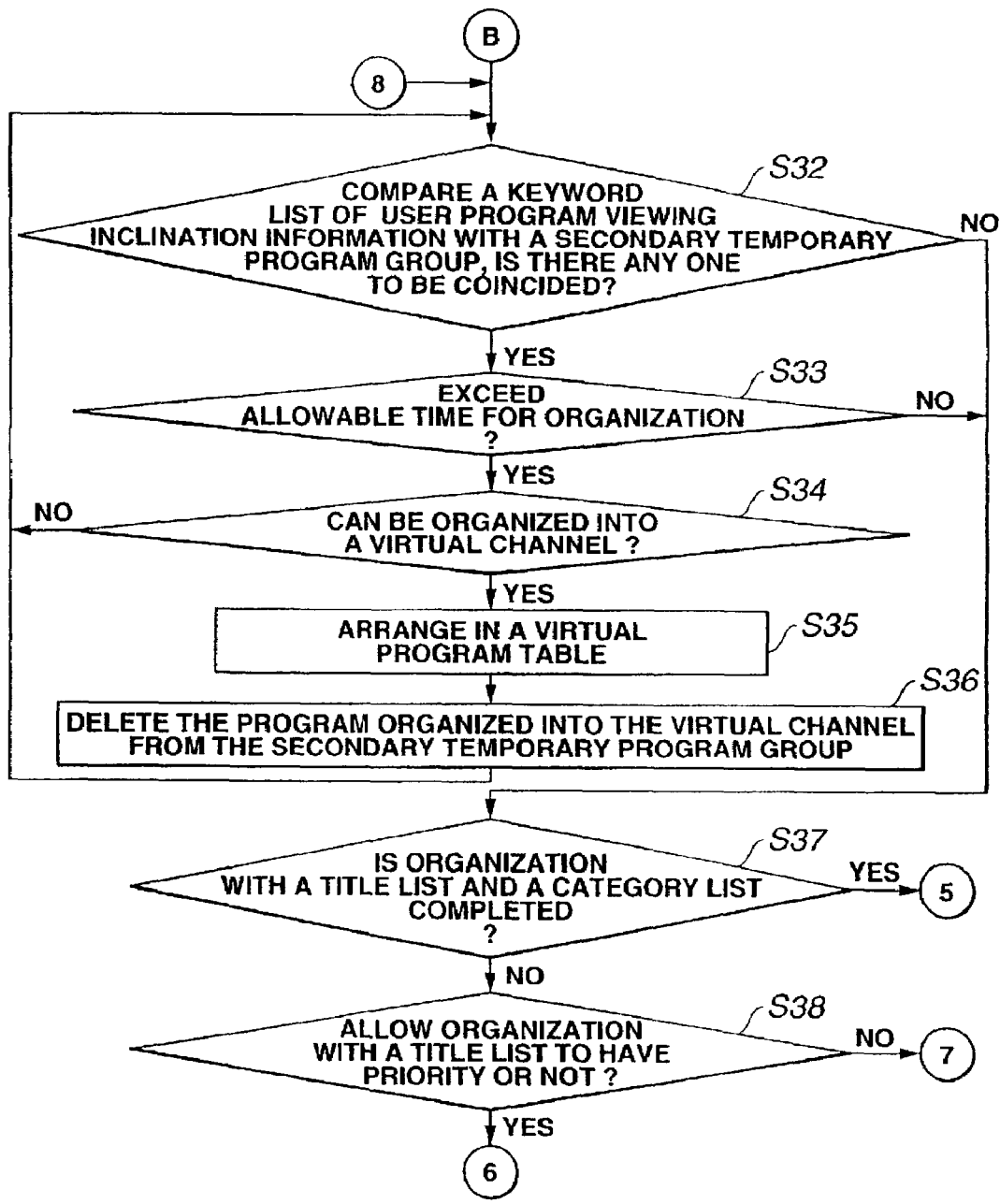
FIG. 6 is a fourth flow chart for explaining the operation for producing a virtual program table in the virtual program table presenting system.

The steps of Step S32~Step S38 are shown in FIG. 6.

In Step S32, the control unit 15 compares a program which is present in a keyword list of user program viewing inclination information with a secondary temporary program group to search one coincided. In a case where the applied program is present, program information of the program is read and the step proceeds to Step 33, and in a case where the applied program is not present, the step proceeds to Step S37.

For example, suppose that a category list of user program viewing inclination information is the category list shown in the above Table 5. And, a secondary temporary program group in a case where program information of a program organized into a virtual channel is deleted in Step S29 of FIG. 5 from the secondary temporary program group shown in Table 24 is shown in Table 25.

TABLE 25

| | | | | Secondary Temporary Program Group | | |
|---|---|---|---|---|---|---|
| Date | Day | Start Time | Time | Title | Cate. | Keyword |
| 2000.09.01 | Fri. | 20:00:00 | 2:00:00 | ΔΔ Japanese film theater | 1 | Yamada ⊚⊚ |
| 2000.09.01 | Fri. | 20:00:00 | 1:00:00 | xx Quiz | 7 | Maeda xx |
| 2000.09.01 | Fri. | 20:00:00 | 1:00:00 | ⊚⊚ Count Down | 4 | Kitagawa○○ |
| 2000.09.01 | Fri. | 20:00:00 | 0:30:00 | ΔΔFishing xx | 8 | Suzuki ΔΔ |
| 2000.09.01 | Fri. | 20:00:00 | 1:00:00 | ΔΔChallenge | 7 | Takada xx |
| 2000.09.01 | Fri. | 20:00:00 | 1:00:00 | xxPro-wres | 3 | Funaki ⊚⊚ |
| 2000.09.01 | Fri. | 20:30:00 | 0:30:00 | ⊚⊚ Introduction | 9 | Hara ΔΔ |
| 2000.09.01 | Fri. | 20:30:00 | 0:30:00 | Olympic□□ | 3 | Takahaxhi ΔΔ |

Since the program classified in category into keyword "Sato ○○" which is highest in value in Table 5 is not present in Table 25, the control unit 15 proceeds the step to Step S37.

In Step S33, the control unit 15 judges, in a case where the program read in Step S32 is arranged in a virtual channel, if it exceeds organizing permissible time of a title list calculated in Step S12. More specifically, for example, broadcasting time of a program which read program information is subtracted form organizing permissible time, and if a negative value results, judgment is made that it exceeds organizing permissible time. In a case of not exceeding organizing permissible time, the step proceeds to Step S34, and in a case of exceeding organizing permissible time, the step proceeds to Step S37.

In Step S34, the control unit 15 calculates a vacant region of a virtual channel, and compares it with broadcasting time of a program obtained from program information read in Step S25 to thereby judge if a program can be arranged in a virtual channel. The control unit 15 proceeds the step to Step S35 in a case where judgment is made that a program can be arranged, and to Step S32 in a case where a program cannot be arranged.

In Step S35, the control unit 15 organizes a program in a virtual channel and arranges its program information in a virtual program table.

In Step S36, the control unit 15 deletes program information of a program organized into a virtual channel in Step S35 from the secondary temporary program group. When Step S36 ends, the step returns to Step S32.

In Step S37, the control unit 15 judges if organizing of programs into virtual channels based on the title list and the category list has been completed, and in a case where organizing is not completed, the step proceeds to Step S38, and to Step S39 shown in FIG. 7 in a case of being completed.

For example, in a case where a program is first organized into a virtual channel on the basis of the title list, and subsequently, a program is organized into a virtual channel on the basis of the category list, the control unit 15 proceeds the step to Step S39.

In Step S38, the control unit 15 judges if organizing of a program into a virtual channel by a title list of user program viewing inclination information takes preference over organizing by a category list. The control unit 15 proceeds the step to Step S17 shown in FIG. 4 in a case where organizing by a title list takes preference, and to Step S25 shown in FIG. 5 in a case of taking no preference.

The preference of the title list and the category list is decided by policy values input in Step S1, and the higher policy value takes preference. For example, suppose that policy values of the title list and the category list are 50% and 30%, respectively, then the title list takes preference, and the control unit 15 proceeds the step to Step S17 shown in FIG. 4.

In a case where organizing of a program into a virtual channel based on the title list or the category list has been already executed, one not executed is selected. For example, even a case where as described above, the policy value of the title list is 50%, and the policy value of the category list is 30%, if a program has been already arranged in a virtual channel on the basis of the title list, this falls under the case where the title list takes no preference, and the step proceeds to Step S25 shown in FIG. 5.

The steps of Step S39~Step S41 are shown in FIG. 7.

Figure 8:
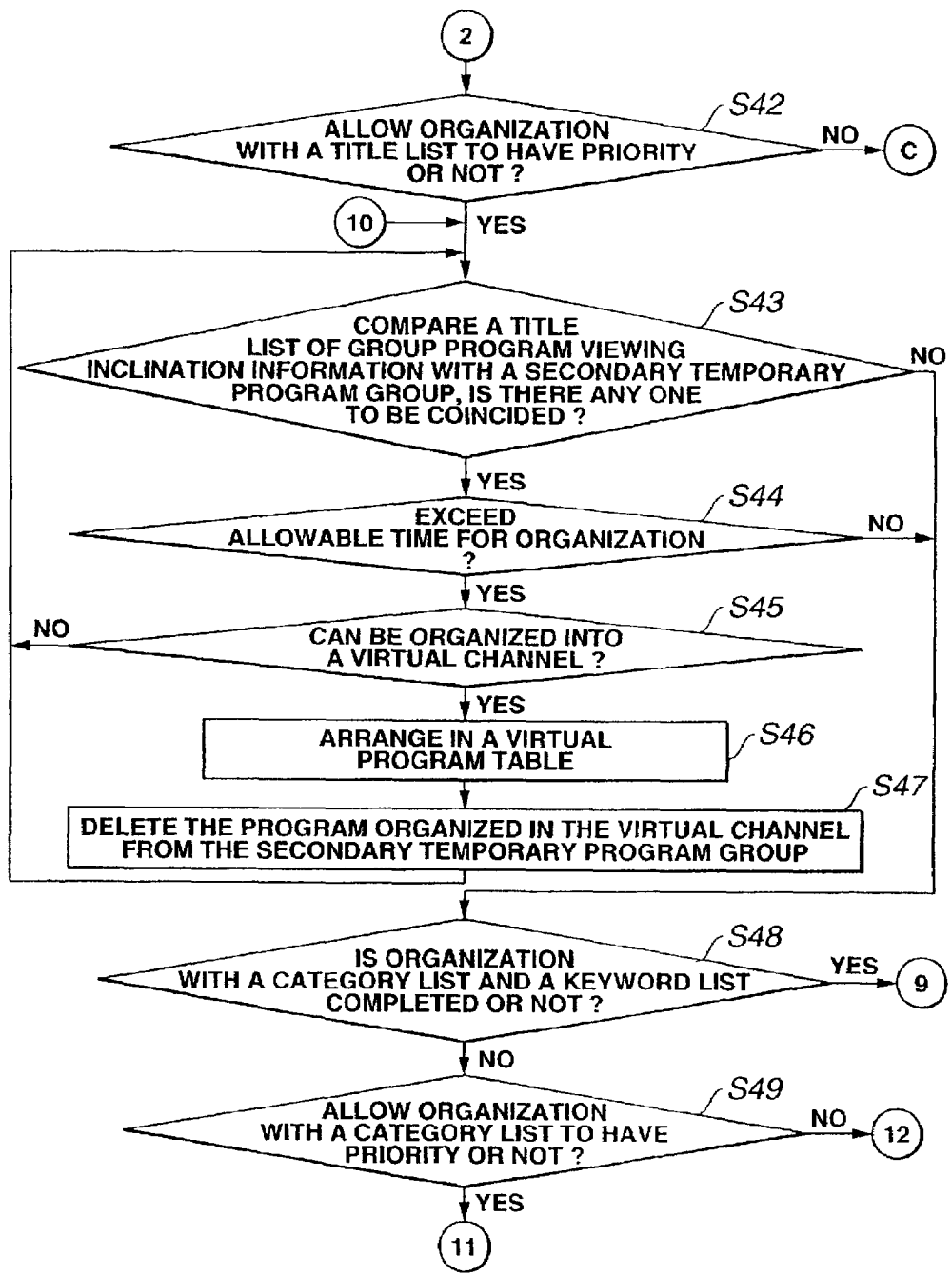
FIG. 8 is a sixth flow chart for explaining the operation for producing a virtual program table in the virtual program table presenting system

In Step S39, the control unit 15 judges if group program viewing inclination information takes preference over user program viewing inclination information in Step S15, and in a case of taking preference, the step proceeds to Step S40, and in a case of not taking preference, the step proceeds to Step S42 shown in FIG. 8. Since the preference of user program viewing inclination information and group program viewing inclination information is decided by the policy values input in Step S1, the higher policy value takes preference. Therefore, suppose that policy values of user program viewing inclination information and group program viewing inclination information are 70% and 30%, respectively, then user program viewing inclination information takes preference, and the control unit 15 proceeds the step to Step S42 of FIG. 8.

In Step S40, the control unit 15 makes virtual program table start time h, h+1 to thereby proceed the step to program organizing into a virtual channel of a next time zone. For example, suppose that h equals to 20 (h=20), the control unit 15 makes it h=21.

In Step S41, the control unit 15 judges if it exceeds preparing time number t of a virtual program table input in Step S1, and in a case of not exceeding, the step returns to Step S14 shown in FIG. 4, and in a case of exceeding the time number t, preparation of a virtual program table is completed.

For example, supposing ST=20 and h=21 at time number t=3 hours, then h−ST=21−20=1<3 results, whereby the control unit 15 returns the step to Step S14.

The steps of Step S42~Step 49 are shown in FIG. 8.

In the former stage for executing the steps from Step S42 shown in FIG. 8, there are two steps due to the difference in policy value input in Step S1 shown in FIG. 1. For example, in a case where a policy value of user program viewing inclination information is higher than a policy value of group program viewing inclination information, after organizing of programs into virtual channels and arrangement of program information in a virtual program table on the basis of a title list, a category list, and a keyword list of user program viewing inclination information have been carried out, organizing of programs into virtual channels and arrangement of program information in a virtual program table on the basis of group program viewing inclination information which starts from Step S42 are executed.

On the other hand, in a case where a policy value of group program viewing inclination information is higher than a policy value of user program viewing inclination information, organizing of programs into virtual channels and arrangement of program information in a virtual program table on the basis of group program viewing inclination information which first starts from Step S42 are executed:

In Step S42, the control unit 15 judges, when programs are organized into virtual channels on the basis of a title list, a category list and a keyword list of group program viewing inclination information, if the title list takes preference over the category list and the keyword list. The control unit 15 proceeds the step to Step S43 in a case where the title list takes preference, and to Step S50 shown in FIG. 9 in a case of not taking preference. The preference of the title list, the category list and the keyword list is decided by the policy values input in Step S1, and the higher policy value takes preference.

For example, suppose that policy values of the title list, the category list and the keyword list are 50%, 30% and 20%, respectively, then the title list takes preference, and the control unit 15 proceeds the step to Step S43.

In Step S43, the control unit 15 compares a program which is present in a title list of group program viewing inclination information with a secondary temporary program group to search one coincided. In a case where the applied program is present, program information of the program is read, and the step proceeds to Step S44, whereas in a case where the applied program is not present, the step proceeds to Step S48.

For example, suppose that a title list of group program viewing inclination information is the title list shown in the above Table 12. Further, as the secondary temporary program group, Table 25 is used.

Since "xxPro-wres" which is highest in value in Table 12 is described in the secondary temporary program group shown in Table 25, the control unit 15 reads program information of the program to proceed the step to Step S44.

In Step S44, the control unit 15 judges, in a case where the program read in Step S43 is organized into a virtual channel, if it exceeds organizing permissible time of the title list calculated in Step S12 of FIG. 4. More specifically, broadcasting time of the read program is subtracted from organizing permissible time, and a negative value results, judgment is made that it exceeds organizing permissible time. In a case of not exceeding organizing permissible time, the step proceeds to Step S45 whereas in a case of exceeding organizing permissible time, to Step S48.

For example, the control unit 15 subtracts, in a case where "xx Pro-wres" is read in Step S43, broadcasting time (60 minutes) of "xx Pro-wres" from organizing permissible time (90 minutes) of the title list calculated in Step S12. Since the calculated organizing permissible time is left by 30 minutes, the control unit 15 proceeds the step to Step S45.

In Step S45, the control unit 15 calculates a vacant region of a virtual channel to compare it with broadcasting time of a program obtained ro4m program information read in Step S43 to thereby judge if a program can be organized into a virtual channel. The control unit 15 proceeds the step to Step S47 in a case where judgment is made that a program can be organized, and returns the step to Step S43 in a case where it cannot be organized.

For example, in a case where "xx Pro-wres" of a 60-minute program from 20 is intended to organize into a virtual channel, a vacant region in the 20 of a virtual channel is 30 minutes from 20:30 of VC-4. Accordingly, since "xx Pro-wres" cannot be organized in any virtual channel, the control unit 15 returns the step to Step S43.

In Step S46, the control unit 15 organizes a program into a virtual channel, and arranges its program information in a virtual program table.

In Step S47, the control unit 15 deletes program information of a program organized into a virtual channel in Step S46 from the secondary temporary program group. When Step S47 ends, the step returns to Step S43.

In the control unit 15, since no coincided program is present in the secondary temporary program group shown in Table 25 and the title list shown in Table 12, organizing of programs into virtual channels on the basis of the title list of group program viewing inclination information is not executed.

Figure 11:
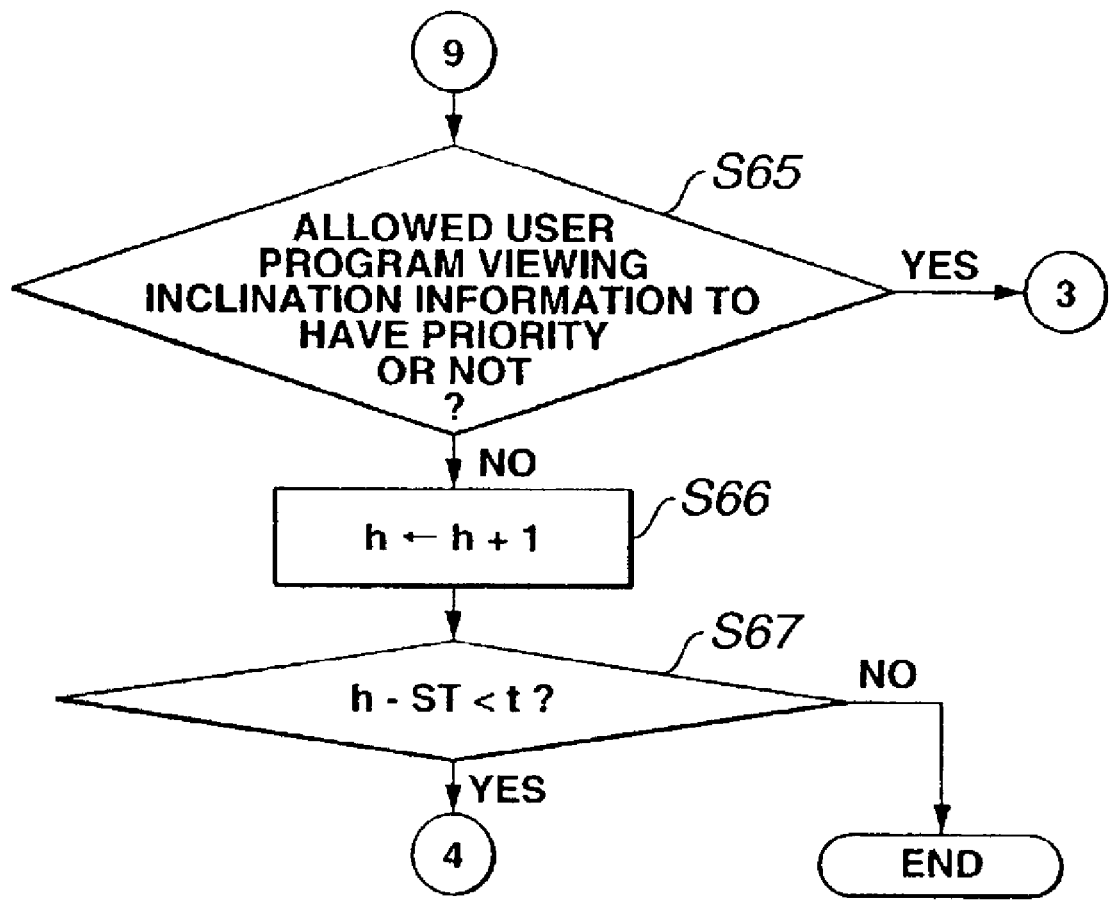
FIG. 11 is a ninth flow chart for explaining the operation for producing a virtual program table in the virtual program table presenting system.

In Step S48, the control unit 15 judges if organizing of programs into virtual channels based on the category list and the keyword list is completed, and in a case where organizing is not completed, the step proceeds to Step S49, and in a case of being complete, to Step S65 shown in FIG. 11.

In Step S49, the control unit 15 judges if organizing of a program into a virtual channel by the category list of group program viewing inclination information takes preference over organizing by the keyword list. The control unit 15 proceeds the step to S51 in a case where organizing by the category list takes preference, and to Step S58 shown in FIG. 10 in a case of not taking preference.

The preference of the category list and the keyword list is decided by the policy values input in Step S1, and the higher policy value takes preference. For example, suppose that policy values of the category list and the keyword list are 30% and 20%, respectively, the category list takes preference, and the control unit 15 proceeds the step to Step S51.

In a case where organizing of programs into virtual channels based on the category list or the keyword list has been already executed, one not executed is selected. For example, even in a case where policy values of the category list and the keyword list are 30% and 20%, respectively, as described above, if a program has been already organized into a virtual channel on the basis of the category list, this falls under the case where the category list takes no preference, and the step proceeds to Step S58 shown in FIG. 10.

Figure 9:
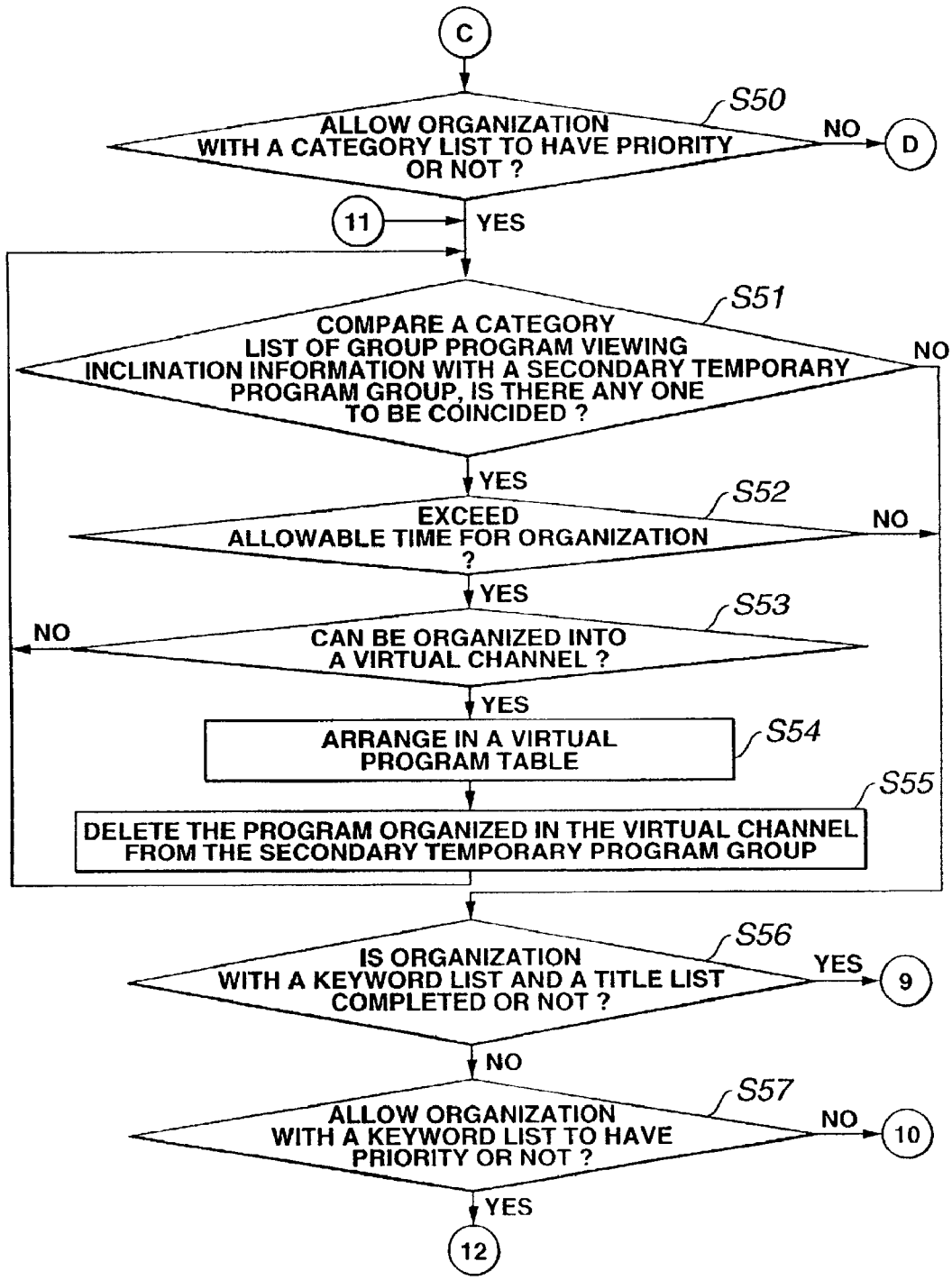
FIG. 9 is a seventh flow chart for explaining the operation for producing a virtual program table in the virtual program table presenting system.

The steps of Step S50–Step S57 are shown in FIG. 9.

In Step S50, the control unit 15 judges if organizing of a program into a virtual channel by a category list of group program viewing inclination information takes preference over arrangement by a keyword list. In a case where arrangement by the category list takes preference, the step proceeds to Step S51, and in a case where arrangement by the keyword list takes preference, the step proceeds to Step S58 shown in FIG. 10.

The Step S49 is executed merely in a case where organizing of a program into a virtual channel by a title list of group program viewing inclination information is desired to take preference in Step S16 of FIG. 4, In Step S51, the control unit 15 compares a program in a category list of group program viewing inclination information with a secondary temporary program group to search one coincided. In a case where the applied program is present, its program information is read, the step proceeds to Step S52, and in a case where the applied program is not present, the step proceeds to Step S56.

For example, suppose that a category list of group program viewing inclination information is the category list shown in the above Table 13. Further, as the secondary temporary program group, Table 25 is used.

The programs classified in category into "Sports 2" of the category number 3 which is highest in value in Table 13 are"xx Pro-wres" in which Start Time of the secondary temporary program group is 20:00:00 and "Olympic☐ ☐" in which Start Time is 20;30;00 shown in Table 25. Since "xx Pro-wres" is judged to be disabled in organizing in Step S45 described above, the control unit 15 reads program information of "Olympic☐ ☐" and proceeds the step to Step S52.

In Step S52, the control unit 15 judges, in a case where a program read in Step S51 is organized into a virtual channel, if it exceeds organizing permissible time of the title list calculated in Step S12 of FIG. 4. More specifically, for example, broadcasting time of the read program is subtracted from permissible arrangement time, and a negative value results, judgment is made that it exceeds organizing permissible time. In a case where it does not exceed organizing permissible time, the step proceeds to Step S53, and to Step S56 in a case of exceeding organizing permissible time.

For example, the control unit 15 subtracts, in a case where program information of "Olympic☐ ☐" in Step S51, broadcasting time (30 minutes) of "Olympic☐ ☐" from organizing permissible time (60 minutes) of the category list calculated in Step S12. Since the calculated organizing permissible time is 30 minutes, the control unit 15 judges that "Olympic☐ ☐" does not exceed organizing permissible time, and proceeds the step to Step S53.

In Step S53, the control unit 15 calculates a vacant region of a virtual channel, and compares it with broadcasting time of a program obtained from program information read in Step S51 to thereby judge if a program can be organized into a virtual channel. The control unit 15 proceeds, in a case where a program can be organized, the step to Step S54, and returns, in a case where it cannot be organized, the step to Step S51.

For example, in a case where "Olympic□ □" which is a 30-minute program from 20:30 is intended to organize into a virtual channel, since a vacant region of a virtual channel coincides with 30 minutes from 20:30 of VC-4, organizing is enabled. Accordingly, the control unit 15 proceeds the step to Step S54.

In Step S54, the control unit 15 organizes a program into a virtual channel, and ranges its program information in a virtual program table.

For example, the control unit 15 organizes "Olympic□ □" into VC-4, and arranges program information in a virtual program table as shown by the diagonal line of FIG. 16.

In Step S55, the control unit 15 deletes program information of a program organized into a virtual channel in Step S54 from the secondary temporary program group. For example, program information of "Olympic□ □" of the secondary temporary program group shown in Table 25 is deleted and as shown in Table 26.

TABLE 26

Secondary Temporary Program Group

| Date | Day | Start Time | Time | Title | Cate. | Keyword |
|---|---|---|---|---|---|---|
| 2000.09.01 | Fri. | 20:00:00 | 2:00:00 | ΔΔ Japanese film theater | 1 | Yamada ◎ ◎ |
| 2000.09.01 | Fri. | 20:00:00 | 1:00:00 | xx Quiz | 7 | Maeda xx |
| 2000.09.01 | Fri. | 20:00:00 | 1:00:00 | ◎ ◎ Count Down | 4 | Kitagawa○○ |
| 2000.09.01 | Fri. | 20:00:00 | 0:30:00 | ΔΔFishing xx | 8 | Suzuki ΔΔ |
| 2000.09.01 | Fri. | 20:00:00 | 1:00:00 | ΔΔChallenge | 7 | Takada xx |
| 2000.09.01 | Fri. | 20:00:00 | 1:00:00 | xxPro-wres | 3 | Funaki ◎ ◎ |
| 2000.09.01 | Fri. | 20:30:00 | 0:30:00 | ◎ ◎ Introduction | 9 | Hara ΔΔ |

When Step S55 ends, the step returns to Step S51.

Since the secondary temporary program group shown in Table 26 and a program corresponding to the category list shown in Table 13 are not present, the control unit 15 is impossible to organize programs to the virtual channel.

In Step S56, the control unit 15 judges if organizing of programs to the virtual channel on the basis of the keyword list and the title list is completed. In a case where organizing is not completed, the step proceeds to Step S57, and in a case of being not completed, the step proceeds to Step S65.

In Step S57, the control unit 15 judges if organizing of programs to the virtual channel by the keyword list of group program viewing inclination information takes preference over organizing by the title list. In a case where organizing by the keyword list takes over the other, the control unit 15 proceeds the step to Step S58 shown in FIG. 10, and in a case of not taking preference, to Step S58 shown in FIG. 8.

The preference of the keyword list and the title list is decided by the policy value input in Step S1, and the higher policy value takes preference. For example, suppose that policy values of the keyword list and the title list are 20% and 50%, respectively, the title list takes preference, and the control unit 15 proceeds the step to Step S43 shown in FIG. 8.

In a case where organizing of programs to the virtual channel on the basis of the keyword list and the title list has been already executed, organizing not executed takes preference. For example, even in a case where the policy value of the title list and the policy value of the keyword list are 50% and 30%, respectively, as mentioned above, if programs to the virtual channel on the basis of the title list has been already organized, this falls under the case where the keyword list takes preference, and the step proceeds to Step S51.

Figure 10:
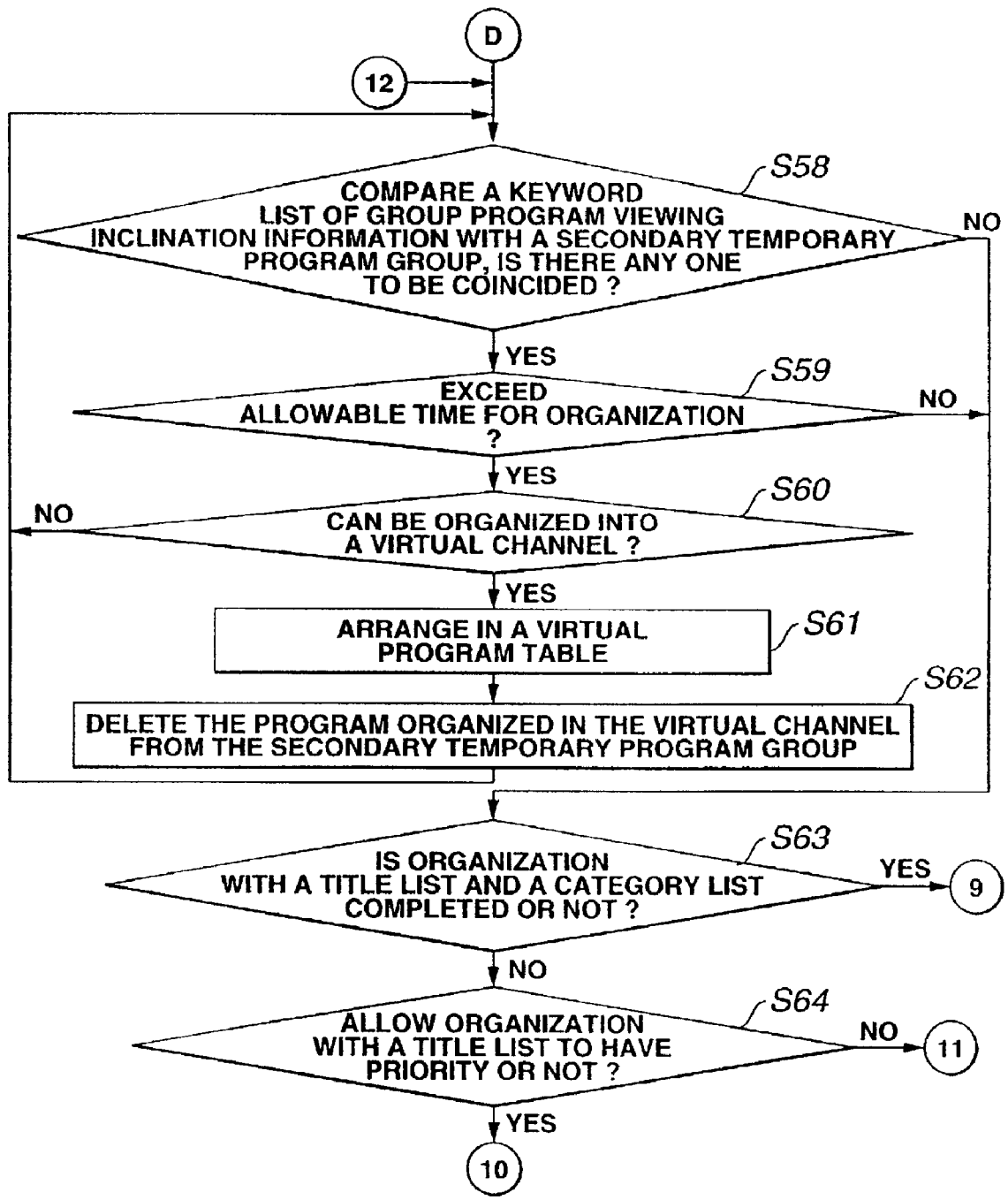
FIG. 10 is an eighth flow chart for explaining the operation for producing a virtual program table in the virtual program table presenting system.

The steps of Step S58~Step S64 are shown in FIG. 10.

In Step S58, the control unit 15 compares programs in the keyword list of group program viewing inclination information with the secondary temporary program group to search those coincided. In a case where the applied program is present, the control unit 15 reads program information, and proceeds the step to Step S59, whereas in a case where the applied program is not present, to Step S63.

For example, suppose that a category list of group program viewing inclination information is the category list shown in Table 14. Table 26 is used for the secondary temporary program group.

Since a program having a keyword of the keyword list in Table 15 as program information is not present in Table 26, the control unit 15 proceeds the step to Step S63.

In Step S59, the control unit 15 judges, in a case where a program which read program information in Step S58 is organized to the virtual channel, if it exceeds organizing permissible time of a title list calculated in Step S1 of FIG. 4. More specifically, for example, broadcasting time of a program read is subtracted from organizing permissible time, and if a negative value results, judgment is made that it exceeds organizing permissible time. In a case not exceeding organizing permissible time, the step proceeds to Step S63.

In Step S60, the control unit 15 calculates a vacant region of a virtual channel and compares it with broadcasting time of a program obtained from program information read in Step S58 to judge it a program can be organized to the virtual channel. In a case where the control unit 15 judged that a program can be organized, the step proceeds to Step S61, and in a case of judgment that a program cannot be organized, returns to Step S58.

In Step S61, the control unit 15 organizes a program to a virtual channel and arranges its program information in a virtual program table.

In Step S62, the control unit 15 deletes program information of a program organized to the virtual channel in Sep S61 out of the secondary temporary program group.

When step S62 ends, the step returns to Step S58.

In Step S63, the control unit 15 judges if organizing of programs to the virtual channel on the basis of the title list and the category list has been completed, and in a case where arrangement is not completed, the step proceeds to Step S64, whereas in a case of being completed, to Step S65 shown in FIG. 11.

For example, in a case where a program is first organized in a virtual title on the basis of a title list and afterward a program is organized in a virtual title on the basis of a category list, the control unit 15 proceeds the step to Step S65 shown in FIG. 11.

In Step S64, the control unit 15 judges if organizing of a program to a virtual channel by a title list of group program viewing inclination information takes preference over organizing by a category list. The control unit 15 proceeds the process to Step S43 shown in FIG. 8 in a case where organizing by a title list takes preference, and to Step S51 shown in FIG. 9 in a case of not taking preference.

The preference of the title list and the category list is decided by the policy value input in Step S1, and the higher policy value takes preference. For example, suppose that policy values of the title list and the category list are 50% and 30%, respectively, the title list takes preference, and the control unit 15 proceeds the step to Step S43.

In a case where organizing of a program to the virtual channel on the basis of the title list or the category list has been already executed, one not executed is selected. For example, even a case where the policy value of the title list is 50% and the policy value of the category list is 30%, if a program has been already organized to the virtual channel on the basis of the title list, this falls under the case where the title list takes no preference, and the step proceeds to Step S51.

The steps of Step S65~Step S67 are shown in FIG. 11.

In Step S65, the control unit 15 judges if user program viewing inclination information took preference over group program viewing inclination information in Step S15, and in a case of having taken preference, the step proceeds to Step S66, and in a case of not having taken preference, the step proceeds to Step S16 shown in FIG. 4. Since the preference of user program viewing inclination information and group program viewing inclination information is decided by the policy value input in Step S1, the higher policy value takes preference, suppose that policies values of user program viewing inclination information and group program viewing inclination information are 70% and 30%, respectively, user program viewing inclination information takes preference, and the control unit 15 proceeds the step to Step S66.

In Step S66, the control unit 15 makes virtual program table start time h, h+1 to thereby proceed the step to program organizing to a virtual channel of a next time zone. For example, suppose that h equals to 20 (h=20), the control unit 15 makes it h=21.

In Step S67, the control unit 15 judges if it exceeds preparing time number t of a virtual program table input in Step S1, and in a case of not exceeding, the step returns to Step S14 shown in FIG. 4, and in a case of exceeding the time number t, preparation of a virtual program table is completed.

For example, supposing ST=20 and h=21 at time number t=3 hours, then h-ST=21−20=1<3 results, whereby the control unit 15 returns the step to Step S14.

In Step S14, the control unit 15 extracts a program group from 21 to 22 from a primary temporary program group to serve it as a secondary temporary program group.

In a manner as described, the steps of Step S14~Step S67 are repeated to extract the secondary temporary program group from the primary temporary program group every hour, organize programs to the virtual channel on the basis of user program viewing inclination information and group program viewing inclination information, and arrange its program information to a virtual program table. For example, suppose that the time number t of a virtual program table is 3 hours, this loop is repeated three times to enable preparing a desired virtual program table.

For example, in the loop of 21=22, first, "World OO soccer" which is a 60-minute program and "⊙⊙ Foreign film theater" which is a 120-minute program are organized at 21 of VC-1 and 21 of VC-2, respectively, on the basis of the title list of user program viewing inclination information, and its program information is arranged in a virtual program table. In the category list of user program viewing inclination information, there is no organizing permissible time already, organizing to the virtual channel is impossible. "Relic ⊙⊙ Exploration" which is a 60-minute program is organized at 21 of VC-3 on the basis of the keyword list of user program viewing inclination information, and program information is arranged in he virtual program table.

Next, "Friday drama ⊙⊙" which is a 60-minute program is organized at 21 of VC-4 on the basis of the title list of group program viewing inclination information, and program information is arranged in he virtual program table. In the category list of group program viewing inclination information and the keyword list of group program viewing inclination information, since all programs have been already organized in the virtual channel in the 21, organizing is impossible.

For example, in the loop of 22~23, first, in the title list and the category list of user program viewing inclination information, there is no organizing permissible time already, organizing in the virtual channel is impossible. "Bowling ΔΔ" which is a 60-minute program is organized at 22:30 of VC-3 on the basis of the keyword list of user program viewing inclination information, and program information is arranged in he virtual program table.

In the title list and the category list of group program viewing inclination information, since organizing permissible time is short, it is impossible to organize a program in a virtual channel. "News ⊙⊙" which is a 30-minute program is organized at 22:30 of VC-4 on the basis of the keyword list of group program viewing inclination information, and program information is arranged in a virtual program table.

One example of a virtual program table prepared using flow charts shown in FIGS. 3 to 11 is shown in FIG. 17.

In the virtual program table presenting system 1 as described, programs are organized in a virtual channel from user program viewing inclination information obtained from a program viewing history of a user accumulated in the data base 12 and group program viewing inclination information for classifying users on the basis of individual information accumulated in the data base 13 and obtained from a program viewing history accumulated in the data base 12 of a user belonging to each group, and program information of each program is arranged on the basis of the virtual channel, whereby a virtual program table according to the taste of a user and the taste of a group to which the user belongs can be produced.

The control unit 15 of the virtual program table producing apparatus 2 may present a virtual program table, in which a channel which organized programs selected by an opinion leader having a voice or a person representative of each generation is added to a virtual channel and its program is arranged, to a user through the terminal device 3.

Further, a user is able to forcibly insert a program desired by the user, even other than programs organized in the virtual channel by an absolute viewing program group accumulated in the data base 13, user program viewing inclination information accumulated in the data base 12, and group program viewing inclination information accumulated in the data base 14, into the virtual channel by the input operation through the terminal device 3.

For example, a normal program table having program information of a normal channel arranged is presented to a user through the terminal device 3, and a "must" button described on each program information column of the normal program table is checked whereby the control unit 15 of the virtual program table producing apparatus 2 forcibly organizes its program in the virtual channel. Further, when the program is organized in the virtual channel by checking the "must" button, its program is organized in a time zone corresponding to the lowest channel number of the virtual channel.

The program forcibly organized in the virtual channel as described above is reflected on user program viewing inclination information and group viewing inclination information, and values of a title, a category and a keyword of the applied program of user program viewing inclination information and group viewing inclination information are incremented.

The embodiments of a program recording system and a program recording method according to the present invention will be descried in detail with reference to the drawings.

Figure 18:
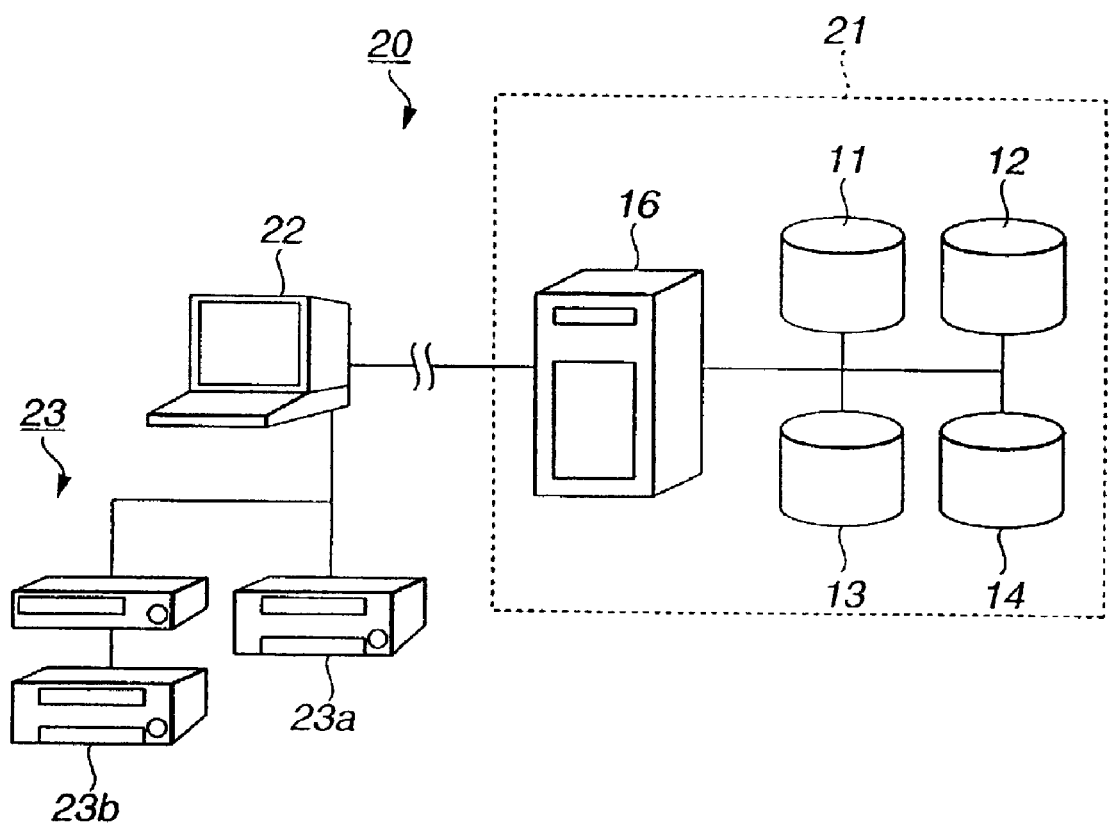
FIG. 18 is a schematic view for explaining the constitution of a program recording system shown as an embodiment of the present invention.

The present invention is applied to the constitution as in a program recording system 20 shown, for example, in FIG. 18.

The program recording system 20 comprises a program recording reservation scripts producing device 21 having data bases 11,12,13 and 14 and a control unit 16, a terminal device 22, and a recording device 23.

The program recording reservation scripts producing device 21 comprises data bases 11,12,13 and 14 provided on the virtual program table producing device 2 explained in the aforementioned virtual program table presenting system 1, and a control unit 16 in which a program recording reservation setting scripts producing function is added to the control unit 15 provided on the virtual program table producing apparatus 2.

The program recording reservation setting scripts producing device 21 produces a virtual program table as explained with reference to the flow charts shown in FIGS. 3~11. The program recording reservation scripts producing device 21 produces program recording reservation scripts which are a command for recording in a recording medium on the basis of the produced virtual program table to transmit them to the terminal device 22.

The program recording reservation setting scripts will be explained. The program recording reservation setting scripts comprise, for example, a declaration sentence for starting the program recording reservation setting scripts, a command ID for designating a recording command, a recording device ID for designating a recording device, an infra ID, a channel number of a program broadcast, broadcasting start time at which a program is broadcast, a broadcasting termination time for terminating broadcasting of a program (broadcasting time number of a program may be used in place of broadcasting termination time), a title of a program broadcast, and a declaration sentence for notifying termination of the program recording reservation setting scripts. The program recording reservation setting scripts are produced on the basis of the virtual channel, but can be farther customized by a user. There are two modes, i.e., a virtual channel mode for producing the program recording reservation setting scripts which are control commands for recording a program virtually broadcast. by a virtual channel in a recording medium without modification, and two modes for customizing a virtual channel.

A normal channel and a request channel will be explained first before two modes for customizing a virtual channel are explained.

The normal channel is all channels for which a user contracts, and a channel that can be viewed by a use, out of channels having a predetermined frequency band.

The request channel is a channel for which a user himself selected according to the user's taste out of the normal channel. For example, suppose that the normal channel has 10 channels comprising 1 to 10 channels. Suppose that the user often views the channel 3 for exclusively broadcasting a movie, and the channel 5 for exclusively broadcasting news. Further, suppose that the user also views the channel 3 for exclusively broadcasting dramas. Suppose that the user designates the channel 3 and the channel 8 as a request channel. As described above, the channels selected according to the user's taste out of channels that can be viewed by the user are the request channel.

One out of two modes for customizing is a request channel mode for customizing using a request channel. In the request channel mode, a program organized in a virtual channel can be replaced by a program broadcast in a request channel according to a command of a user.

The other mode for customizing is a normal channel mode for customizing using a normal channel. In the normal channel mode, a program organized in a virtual channel can be replaced by a program broadcast in a normal channel according to a command of a user.

The terminal device 22 encases therein a tuner for receiving a ground wave, a BS (Broadcasting Satellite) tuner, and a CS (Communications Satellite) tuner. Each tuner receives a modulated program carried by an electric wave of a predetermined frequency to demodulate it to a program comprising a VIDEO signal and an AUDIO signal. The terminal device has a recording medium kept therein or a recording unit having a recording medium mounted thereon to record a program in the recording medium. The recording medium comprises a magnetic tape, a magnetic disk, a photomagnetic disk, or an optical disk. The terminal device 22 receives program recording reservation setting scripts transmitted from the program recording reservation setting scripts producing apparatus 21. The control unit of the terminal device 22 converts the received program recording reservation setting scripts into a recording reservation control signal suitable for a recording unit, and controls the recording unit according to the converted recording reservation control signal to record a signal in the recording medium.

Further, the terminal device 22 converts, when the program recording reservation setting scripts are transmitted to the recording device 23 designated by the program recording reservation setting scripts, the program recording reservation setting scripts into a control signal according to each recording device 23 after which the control signal is transmitted. The terminal device 22 converts the program recording reservation setting scripts into, for example, an IR (Infra Red) control signal, a LAN (Local Area Network) control signal, or an iLINK (registered trade mark) control signal, after which the program recording reservation setting scripts are transmitted.

The recording device 23 encases therein a tuner for receiving a ground wave, a BS tuner, and a CS tuner. Each tuner receives a modulated program carried by an electric wave of a predetermined frequency to demodulate to demodulate it into a program comprising a VIDEO signal and an AUDIO signal. The recording device 23 has a recording medium kept therein or a recording unit having the recording medium mounted thereon to record a program in he recording medium. The recording medium comprises a magnetic tape, a magnetic disk, a photomagnetic disk or an optical disk. The recording device 23 receives a recording reservation control signal based on the program recording reservation setting scripts transmitted from the terminal device 22 The control unit of the recording device 23 receives a recording reservation control signal transmitted from the terminal device 22, and controls the recording unit according to the recording reservation control signal to record a program in the recording medium.

The recording device 23 is a device which encases herein, for example, a tuner shown in a recording device 23a of FIG. 18, a magnetic tape being a recording medium, or a device in which a tuner shown in 23b is separated from a recording unit. Further, the recording device 23 may be constituted by a plurality of tuner-encased type recording devices and a tuner, and a recording device of the type in which a tuner is mounted externally thereof, and in a case where program recording reservation setting scripts produced are constituted by n-number of virtual channels, the above-described devices are combined so that the tuner may receive the n-channels simultaneously, and may record the received n-channel programs to thereby enable recording reservation setting of all programs of he virtual channel.

Further, there may be a device in which in a case where program recording reservation setting scripts transmitted to the terminal device 22 are constituted by n-number of virtual channels, a tuner capable of receiving n-channel and n-number of recording units are provided in a single recording device 23.

Figure 19:
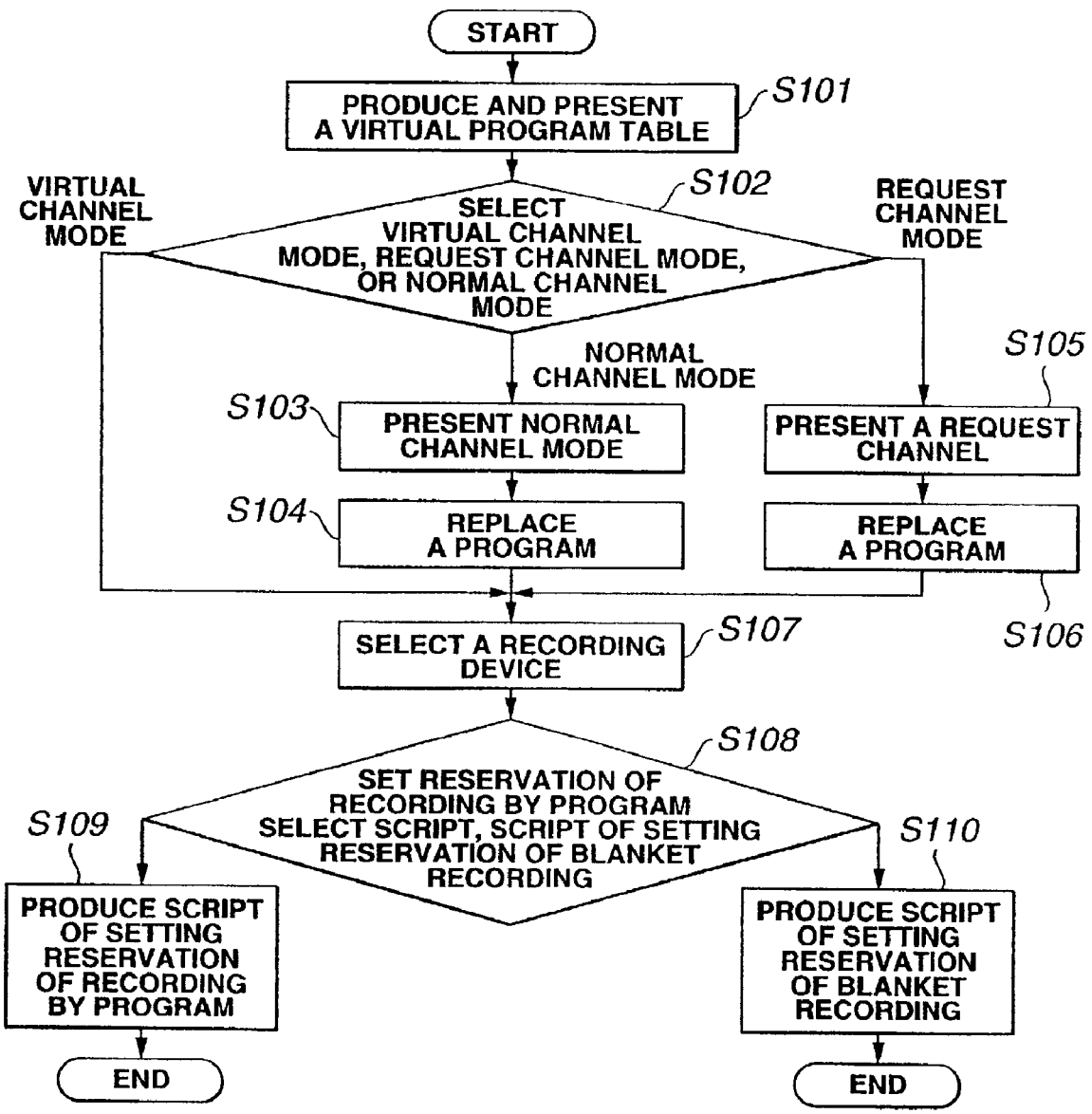
FIG. 19 is a flow chart for explaining the operation for producing program recording reservation setting scripts in the program recording system.

In the following, the operation for producing program recording reservation setting scripts by the program recording reservation setting scripts producing apparatus 21 will be described with reference to FIG. 19.

In Step S101, the control unit 16, as explained using the flow charts shown in FIGS. 3~11, organizes programs to be broadcast in the virtual channel and arranges its program information to produce a virtual program table. For Example, the virtual program table as shown in FIG. 17 is produced. The control unit 16 transmits the produced virtual program table to the terminal device 22. The terminal device 22 receives a virtual program table, and displays the virtual program table as shown in FIG. 17, for example, to the display unit.

In Step S102, the control unit 16 judges if program recording reservation setting scripts are produced in a virtual channel mote, a request channel mode or a normal channel mode according to the input of a user from the terminal device 22. In a case where the virtual channel mode is selected, the step proceeds to Step S107; in a case where the normal channel mode is selected, the step proceeds to Step S103; and in a case where the request channel mode is selected, the step proceeds to Step S105.

In Step S103, the control unit 16 presents a normal channel program table to the terminal device 22. For example, the normal channel program table is as shown in FIG. 20, and the normal channel program table is displayed on the display unit of the terminal device 22 to present it to the user. The normal channel program table is one in the same time zone as the virtual program table.

In Step S104, the control unit 16 organizes a program selected from the normal channel program table in the virtual channel by the input of a user from the terminal device 22 to arrange it in the virtual program table.

For example, in a case where "xx Pro-wres" broadcast at 20 in CH1 is arranged in the virtual program table for recording reservation, first, a program to be an object for replacement arranged in the virtual program table is designated and deleted. The defecting is executed by checking a "cancel" button as shown in FIG. 21 described on each program information column of the virtual program table. Here, "○○ News" and "News & sports" of VC-2 are deleted.

In the following, when a "reservation" button displayed on the program information column of "xx Pro-wres" in the normal channel program table shown in FIG. 22 is checked, "xx Pro-wres" is organized in the virtual channel, and its program information is arranged at a position of 20 in the virtual program table.

Further, when a "reservation button" is checked, a program organized in the virtual channel is reflected on user program viewing inclination information and group program viewing inclination information, and values of a title, a category, and a keyword of the applied program of user program viewing inclination information and group program viewing inclination information are incremented.

Here, the control unit 16 judges whether or not a program organized from a normal channel to a virtual channel having program information arranged in a virtual program table is a program in a series form by searching program information accumulated in the data base 11. If the program is in a series form, it is stored as the initial condition when a virtual channel is organized, and automatically organized when a virtual channel is organized next time.

In Step S105, the control unit 16 presents a program arranged in a request program table to the terminal device 3. Suppose for example that a user has registered CH1, CH2, CH3 and CH4 as a request channel. The request channel program table is as shown in FIG. 23, and the request channel program table is displayed on the display unit of the terminal device 22 and presented to the user. The request channel program table is in the same time zone as the virtual program table.

In Step S106, the control unit 16 organizes a program selected from a request channel in a virtual channel by the Input of a user from the terminal device 22, and arranges program information in the virtual program table. The method of arraignment is the same as that it is arranged from the normal channel program table to the virtual program table.

Here, the control unit 16 judges whether or not a program organized from a normal channel to a virtual channel having program information arranged in a virtual program table is a program in a series form by searching program information accumulated in the data base 11. If the program is in a series form, it is stored as the initial condition when a virtual channel is organized, and automatically organized when a virtual channel is organized next time.

Figure 24:
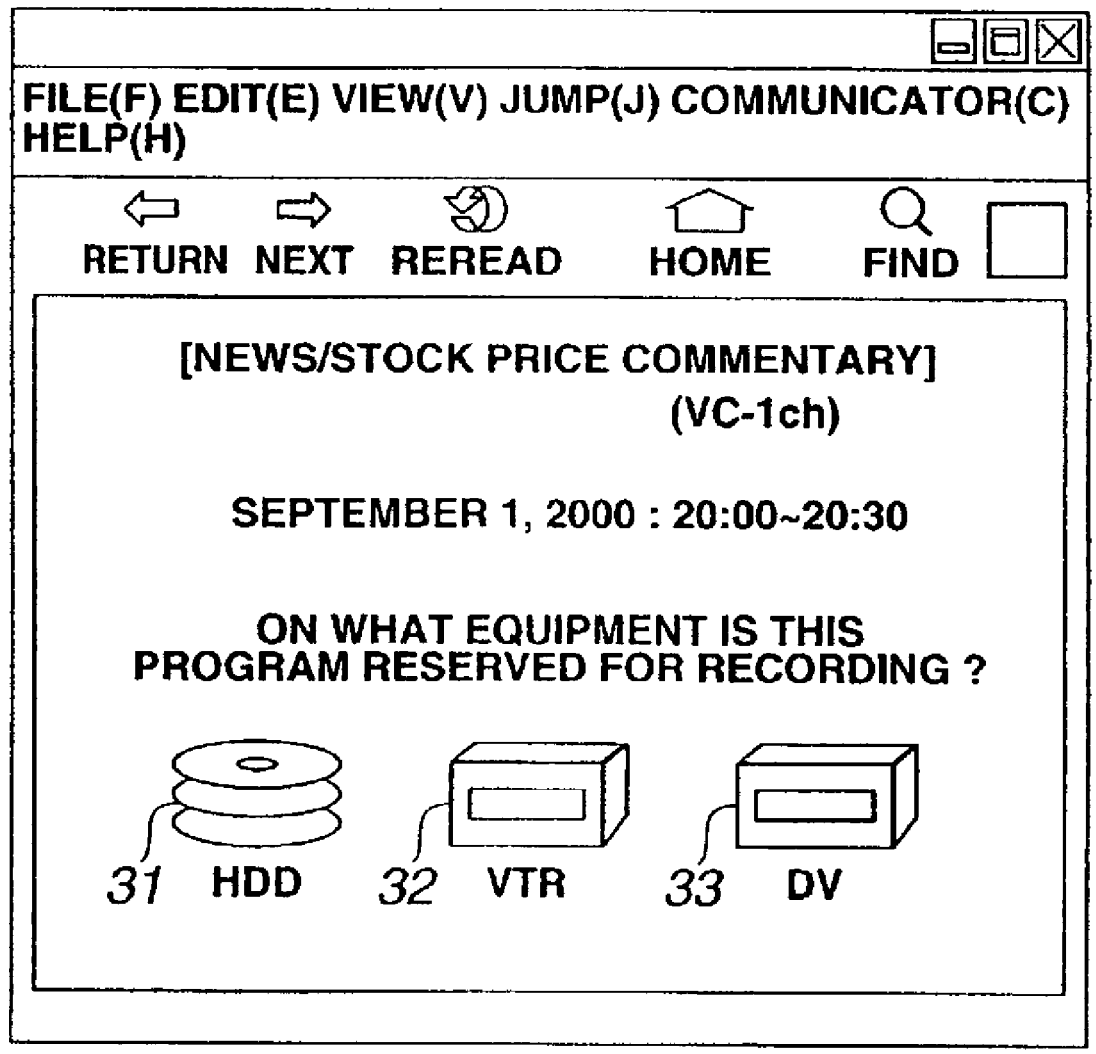
FIG. 24 is a view for explaining one example of a method for selecting a recording apparatus for recording a program in the program recording system.

In Step S107, the control unit 16 makes selection of a recording unit of the terminal device 22 for transmitting a recording reservation control signal by the input of a user and the recording device 23. In the selection of a recording unit of the terminal device 22 and the recording device 23, for example, a recording unit of the terminal device 22 and the recording device 23 as shown in FIG. 24 display a section menu for selecting a recording unit of the terminal device 22, and the recording device 23 imaged by icons 31, 32, and 33 to click the icons 31, 32, and 33 thereby selecting a recording unit of the terminal device 22. The icon 31 shown in FIG. 24, for example, indicates a HDD (Hard Disk Drive) of the terminal device; the icon 32 indicates a VTR (Video Tape Recorder) of a terminal device 23a, and the iron 33 indicates a DV (Digital Video) of a terminal device 23b.

It is supposed that tie recording unit of the terminal device 22 aid the selection device 23 are registered in advance by a user when a service in the program recording system 20 is utilized. When the the recording unit of the terminal device 22 and the selection device 23 are selected, a similar iron is displayed on each program information column of the virtual program table so as to understand which recording unit of the terminal device 22, and what recording device 23 were selected.

In Step S108, the control unit 16 judges if program recording reservation setting scripts by program or blanket program recording reservation setting scripts is produced by the input of a user from the terminal device 22. The control unit 16 proceeds the step to Step S109 in a case where the program recording reservation setting scripts by program are selected, and to Step S110 in a case where the blanket program recording reservation setting scripts are selected.

The program recording reservation setting scripts by program are the program recording reservation setting scripts produced every one program. For example, as shown in FIG. 25, the program recording reservation setting scripts by program performs designation which recording device 23 is used in one program recording reservation setting script, or recording of which program of which channel is reserved.

The blanket program recording reservation setting scripts performs recording reservation of different programs by one program recording reservation setting script. For example, as shown in FIG. 26, the blanket program recording reservation setting scripts merely produces one program recording reservation setting script also when reservation is made for recording a plurality of programs by using a plurality of the recording devices 23.

In Step S109, the control unit 16 produces the program recording reservation setting scripts by program to transmit them to the terminal device 22.

In Step S110, the control unit 16 produces the blanket program recording reservation setting scripts to transmit them to the terminal device 22.

Each program recording reservation setting script produced in Step S101~Step S110 is converted into a desired signal and transmitted to the recording unit of the terminal device 22, and the recording device 23, where recording reservation setting of programs is executed.

The program recording reservation setting script producing device 21 of the program recording system 20 is also possible to transmit the produced virtual program table to a portable terminal device. The portable terminal device is, for example, a portable telephone provided with a display unit for displaying text data and image data, and PDA (Personal Digital Assistants), and is a portable type device capable of transmitting and receiving information through an Internet. The portable terminal device indicates, when it receives a virtual program table transmitted from the program recording reservation setting scripts producing device 21, the virtual program table to a user through the display unit. The user having The virtual program table indicated through the portable terminal device checks a program desired to carry out recording reservation setting referring to the virtual program table and transmits a control command for producing program recording reservation setting scripts to the program recording reservation setting scripts producing device 21 to enable producing the recording reservation setting scripts. In response to the control command transmitted from the portable terminal device, the program recording reservation setting scripts producing device 21 produces the program recording reservation setting scripts in the procedure shown in the above Step S101~Step 110 to carry out recording reservation setting of programs with respect to the recording unit of the terminal device 22 and the recording device 23. The command of recording reservation setting input from the portable terminal device is reflected on user program viewing inclination information and group program viewing inclination information when the virtual channel is organized, and values of a title, a category, and a key word of the applied program are incremented.

In such as program recording system 20 as described, program recording reservation setting scripts which are control commands for recording programs in a recording medium are produced by the program recording reservation setting scripts producing device 21 on the basis of the virtual program table, and recording in programs of the recording unit of the terminal device 22 and the recording device 23 is controlled by a control signal based on the produced program recording reservation setting scripts to enable recording of programs of the user's taste and the taste of a group to which the user belongs.

In the foregoing, as the applied examples of the present invention, there is shown a virtual program table presenting system 1 comprising a virtual program table producing device 2 for organizing programs broadcast by a plurality of real channels having a predetermined frequency band, producing a virtual program table on the basis of the virtual channel and transmitting the produced virtual program table, and a terminal device 3 for receiving a virtual program table transmitted from the virtual program table producing device 2 to indicate it to a user.

The virtual program table producing device 2 of the virtual program table presenting system 1 can be replaced by a virtual content program guide producing device for producing a virtual content program guide for selecting contents in accordance with a predetermined selection reference to organize it to a virtual content group which is a virtual group, and arranging content information which is an attribute of each content on the basis of the virtual content group.

The virtual content program guide producing device produces a content program guide in which when contents including not less than one of either stationary image data, moving image data, voice data or text data administrated by one or more content presenting devices are presented to the terminal device 3 through an information transmission medium such as an Internet in a download type or a streaming type, the content which is high in user's taste is organized in a virtual content group, and content information is arranged on the basis of the virtual co group.

Here, the virtual content group produced in the present invention and the virtual content program guide will be explained.

One or more content presenting devices which accumulate and administrate contents to be presented to a user accumulate a plurality of contents including not less than one of either stationary image data, moving image data, voice data or text data. The gathering of the plurality of contents is an actual content group or a real co group.

On the other hand, the virtual content group is a group in which contents are selected from the real content group on the basis of the user's taste and content information which is attribute information of each content and organized as a virtual group so that as if only the contents suited for the user's taste are accumulated in the content presenting device as content resources. Further, the virtual content group corresponds to the virtual channel organized by the virtual program table presenting device 2.

The virtual content program guide is a program guide visually indicated with respect to a user making use of contents produced on the basis of the aforementioned virtual content group. The virtual content program guide corresponds to a virtual program table produced by the virtual program table presenting device 2.

The virtual content program guide is a program guide producing device produces the virtual content program guide, applying the procedure for producing a virtual program table via the steps of Step S1~Step S67 on the basis of user program viewing inclination information and group program viewing inclination information produced from the user's program viewing history accumulated in the data base 12 by the control unit 15 of the virtual program table producing device 2, on the basis of group content utilization inclination information indicating utilization inclination of contents of a group to which a user belongs corresponding to user content utilization inclination information and or group program viewing inclination information indicating utilization inclination of contents of a user corresponding to user program viewing inclination information produced from a content utilization history of a user.

The virtual content group has two kinds, i.e., a virtual content group which is a gathering of contents, and a virtual content group for organizing contents having a conception of time in time sequence adjusting to the utilization form of a user.

The content for which date and time transmitted is not limited out of contents transmitted to the terminal device 3 from the content presenting device is organized, in a case where it is organized in one group as a virtual content group, in a virtual content group as a mere content group having not conception of the order in time sequence.

On the other hand, the content provided with the conception of time as attribute information, for example, such as a content for which date and time transmitted is determined or a content which make meaning first by being presented to a user in the predetermined order can be organized in the virtual content group in consideration of the conception of the order in time sequence on the basis of content information which is attribut information of contents and or user content utilization inclination information and or group content utilization inclination information. The content group in consideration of the content of the order in time sequence indicates a virtual content group organized in the understandable order without occurrence of contradiction when a user makes use of contents. For example, in a continuous drama, a first story and a second story are organized in the old order. Or, in a stock news, it can be organized in the order from old information to new information.

Further, by applying the procedure for producing program recording reservation setting scripts which are control commands for recording programs from a virtual program table in a recording medium in the steps of S101~Step S110 described above, it is possible to produce content recording reservation setting scripts from the virtual content program guide produced as described above and record contents in the respective recording media from the recording unit of the terminal device 22 of the program recording system 20, and the recording device 23.

The virtual content program guide producing device as described above is possible to produce virtual content programs and indicate contents which is high in the user's taste when contents including not less than one of either stationary image data, moving image data, voice data or text data are presented to the user by the content presenting device.

Further, the virtual content program guide producing device is possible to produce, when contents which need scheduling in terms of requiring a predetermined time for reproducing as in contents including moving image data and voice data or which change in value of contents depending on the order for presenting contents are presented, a virtual content program guide in consideration of the conception of time to indicate contents in consideration of the content utilization circumstances of a user.

INDUSTRIAL APPLICABILITY

As will be apparent also from the above explanation, the virtual program table producing apparatus according to the present invention selects a program on the basis of the user's taste, user program viewing inclination information by a user's viewing history produced by user program viewing inclination information producing means, and group program viewing inclination information by a group's viewing history to which a user belongs produced by group program viewing inclination information producing means, organizes the selected program in a virtual channel virtually having a frequency band owned by a plurality of real channels by virtual channel organizing means, and takes program information out of program information accumulation means on the basis of the organized virtual channel to arrange it, thereby enabling producing a virtual program table having program information reflective of the user's taste.

As will be apparent also from the above explanation, the virtual program table producing method according to the present invention selects a program on the basis of the user's taste, and user program viewing inclination information obtained from a user's viewing history to which a user belongs, organizes the selected program in a virtual channel virtually having a frequency band owned by a plurality of real channels, and arranges program information on the basis of the organized virtual channel, thereby enabling producing a virtual program table having program information reflective of the user's taste.

As will be apparent also from the above explanation, the virtual program table presenting system according to the present invention selects a program on the basis of the user's taste, user program viewing inclination information by a user's viewing history produced by user program viewing inclination information producing means, and group program viewing inclination information by a group's viewing history to which a user belongs produced by group program viewing inclination information producing means, organizes the selected program in a virtual channel virtually having a frequency band owned by a plurality of real channels by virtual channel organizing means, and takes program information out of program information accumulation means on the basis of the organized virtual channel to arrange it, to produce a virtual program table, to transmit the produced virtual program table by transmission means, to receive the transmitted virtual program table by receiving means of the terminal device, and to output and display the virtual program table by output and display means, thereby enabling producing a virtual program table having program information reflective of the user's taste.

As will be apparent also from the above explanation, the virtual program table presenting method according to the present invention selects a program on the basis of the user's taste, user program viewing inclination information obtained from a user's viewing history, and group program viewing inclination information obtained from a group's viewing history, organizes the selected program in a virtual channel virtually having a frequency band owned, and arranges it on the basis of the organized virtual channel, to produce a virtual program table, to transmit the produced virtual program table, to receive the transmitted virtual program table, and to output and display the virtual program table, thereby enabling producing a virtual program table having program information reflective of the user's taste.

As will be apparent also from the above explanation, the program recording system according to the present invention selects a program on the basis of the user's taste, user program viewing inclination information by a user's viewing history produced by user program viewing inclination information, and group program viewing inclination information by a group's viewing history to which a user belongs produced by group program viewing inclination information producing means, organizes the selected program in a virtual channel virtually having a frequency band owned by a plurality of real channels by virtual channel organizing means, produces program recording reservation setting scripts which are control commands for controlling a recording device and recording the program organized in the virtual channel in a recording medium, converts the produced program recording reservation setting scripts into a control signal suitable for a recording device by signal conversion means of a program recording reservation setting script receiving device, and controls the recording device on the basis of the control signal, thereby enabling recording of a program reflective of the user's taste without complicated operation.

As will be apparent also from the above explanation, the program recording method according to the present invention selects a program on the basis of the user's taste, user program viewing inclination information obtained from a user's viewing history, and group program viewing inclination information obtained from a group's viewing history to which a user belongs, organizes the selected program in a virtual channel virtually having a frequency band owned by a plurality of real channels, produces program recording reservation setting scripts which are control commands for recording the program organized in the virtual channel in a recording medium, converts the produced program recording reservation setting scripts into a suitable control signal, and records it in a recording medium on the basis of the control signal, thereby enabling recording of a program reflective of the user's taste without complicated operation.

As will be apparent also from the above explanation, the virtual content program guide producing apparatus according to the present invention organizes a virtual content group which is a virtual group by virtual content group organizing means on the basis of user content utilization inclination information showing what content is utilized by a user in which each content of a real content group constituted by a plurality of contents is produced from a content utilization history of a user by user content utilization inclination information producing means is produced and or group content utilization inclination information showing what content is utilized by each group to which a user belongs produced from a co utilization history of a user by group content utilization inclination information producing means, and content information which is attribute information of contents, and arranges content information on the basis of a virtual content group by virtual co program guide producing means, thereby enabling producing of a virtual content program guide having content information reflective of the user's taste.

The invention claimed is:

1. A virtual program table producing apparatus comprising:
   means for storing a program viewing history of viewed programs;
   means for producing user program viewing inclination information indicating a first program a first user views based on the user's stored program viewing history, the first user program viewing inclination information including a first value indicating a number of times the first user views the first program, wherein the first value is a numerical value that is incremented each time the first user views the first program for an amount of time greater than a predetermined amount of time;
   means for producing group program viewing inclination information indicating a second program a group of users view, based on the stored program viewing history, wherein the group program viewing inclination information includes a second value indicating a number of times the group of users view the second program;
   means for receiving a policy value indicating a preference of the first user;
   means for organizing a virtual channel by organizing programs broadcast in real channels having a predetermined frequency band into virtual channels based on the user program viewing inclination information, the group program viewing inclination information, and the policy value, wherein a number of programs organized in the virtual channels based on the user program viewing inclination information is in ratio with a number of programs organized in the virtual channels based on the group program viewing inclination information, the ratio being identified by the policy value;
   means for accumulating program information as attribute information of programs broadcast in the real channels; and
   means for producing a virtual program table by fetching program information of the programs from the accumulated program information and associating the fetched program information, in the virtual program table, with the virtual channels.

2. The virtual program table producing apparatus of claim 1, wherein the virtual channel includes programs not viewed by the first user.

3. The virtual program table producing apparatus of claim 1 further comprising:
   means for transmitting the virtual program table.

4. The virtual program table producing apparatus of claim 1 further comprising:
   means for virtual channel changing replacing a program organized in the virtual channel by a program organized in the real channel based on the first value and the second value.

5. The virtual program table producing apparatus of claim 4 further comprising:
   means for producing program recording reservation setting scripts generating control commands for recording, in a recording medium, a program organized in the virtual channel.

6. The virtual program table producing apparatus of claim 5 further comprising:
   means for transmitting the program recording reservation setting scripts.

7. A virtual program table producing method performed by a virtual program table producing apparatus, the method comprising:
   producing user program viewing inclination information indicating a first program a first user views based on the first user's program viewing history, the user program viewing inclination information including a first value indicating a number of times the first user views the first program, wherein the first value is a numerical value that is incremented by the virtual program table producing apparatus each time the first user views the first program for an amount of time greater than a predetermined amount of time;

classifying users into groups based on individual information of the users;

producing group program viewing inclination information indicating a second program a group of users view, based on program viewing history of the group of users, wherein the group program viewing inclination information includes a second value indicating a number of times the group of users view the second program;

receiving a policy value indicating a preference of the first user;

organizing programs broadcast in channels having a predetermined frequency band into virtual channels based on the user program viewing inclination information, the group program viewing inclination information, and the policy value, wherein a number of programs organized in the virtual channels based on the user program viewing inclination information is in ratio with a number of programs organized in the virtual channels based on the group program viewing inclination information, the ratio being identified by the policy value; and producing a virtual program table by associating attribute information corresponding to program information of the programs with the virtual channels.

8. The virtual program table producing method of claim 7, wherein the virtual channel includes a program not viewed by the first user.

9. The virtual program table producing method of claim 7, further comprising transmitting the virtual program table.

10. The virtual program table producing method of claim 7, further comprising replacing a program organized in the virtual channel with a program organized in the real channel based on the first value and second value.

11. The virtual program table producing method of claim 10, further comprising producing program recording reservation setting scripts generating control commands for recording, in a recording medium, a program organized in the virtual channel.

12. The virtual program table producing method of claim 11, further comprising transmitting the program recording reservation setting scripts.

13. A virtual program table presenting system comprising:
means for storing a program viewing history of viewed programs;
a virtual program table producing apparatus comprising:
means for producing user program viewing inclination information indicating a first program a first user views based on the first user's stored program viewing history, the user program viewing inclination information including a first value indicating a number of times the first user views the first program, wherein the first value is a numerical value that is incremented each time the first user views the first program for an amount of time greater than a predetermined amount of time;
means for producing group program viewing inclination information indicating a second program a group of users view, based on the stored program viewing history, wherein the group program viewing inclination information includes a second value indicating a number of times the group of users view the second program;
means for receiving a policy value indicating a preference of the first user;

means for organizing a virtual channel by organizing programs broadcast in real channels having a predetermined frequency band into virtual channels based on the user program viewing inclination information, group program viewing inclination information, and the policy value, wherein a number of programs organized in the virtual channels based on the user program viewing inclination information is in ratio with a number of programs organized in the virtual channels based on the group program viewing inclination information, the ratio being identified by the policy value;
means for accumulating program information as attribute information of programs broadcast in the real channels;
means for producing a virtual program table by fetching program information of the programs from the accumulated program information and associating the fetched program information, in the virtual program table, with the virtual channels; and
means for transmitting the virtual program table; and
a virtual program table receiving apparatus comprising:
input means for inputting individual information of the first user;
first means for receiving the virtual program table; and
means for displaying the received virtual program table.

14. The virtual program table presenting system of claim 13, wherein the virtual channel includes a program not viewed by the first user.

15. The virtual program table presenting system of claim 13, wherein the virtual program table producing apparatus further comprises means for replacing a program organized into the virtual channel with a program organized in the real channel.

16. The virtual program table presenting system of claim 15, wherein the virtual program table producing apparatus further comprises means for producing program recording reservation setting scripts generating control commands for recording, in a recording medium, a program arranged in the virtual channel.

17. The virtual program table presenting system of claim 16, wherein the means for transmitting transmits the program recording reservation setting scripts.

18. The virtual program table presenting system of claim 17, wherein the first means for receiving receives the program recording reservation setting scripts.

19. The virtual program table presenting system of claim 13, wherein the virtual program table receiving apparatus further comprises second means for receiving a program arranged in the virtual channel.

20. The virtual program table presenting system of claim 18, wherein the virtual program table receiving apparatus further comprises means for converting the received program recording reservation setting scripts into a control signal.

21. The virtual program table presenting system of claim 19, wherein the virtual program table receiving apparatus further comprises means for recording, in a recording medium, the program received by the second means for receiving.

22. The virtual program table presenting system of claim 20, wherein the virtual program table receiving apparatus further comprises:
means for driving and controlling the means for recording based on the converted control signal; and
means for recording, in the recording medium, the program received by the second means for receiving.

23. A virtual program table presenting method performed by a virtual program table producing apparatus, the method comprising:

producing user program viewing inclination information indicating a first program a first user views based on a user's program viewing history, the user program viewing inclination information including a first value indicating a number of times the first user views the first program, wherein the first value is a numerical value that is incremented by the virtual program table producing apparatus each time the first user views the first program for an amount of time greater than a predetermined amount of time;

inputting individual information indicating attributes of users;

classifying the users into groups based on the individual information;

producing group program viewing inclination information indicating a second program a group of users view, based on a program viewing history of the group of users, wherein the group program viewing inclination information includes a second value indicating a number of times the group of users view the second program;

receiving a policy value indicating a preference of the first user;

organizing programs broadcast in channels having a predetermined frequency band into virtual channels based on the, user program viewing inclination information, the group program viewing inclination information, and the policy value, wherein a number of programs organized in the virtual channels based on the user program viewing inclination information is in ratio with a number of programs organized in the virtual channels based on the group program viewing inclination information, the ratio being identified by the policy value; and producing a virtual program table by associating attribute information corresponding to program information of the programs with a virtual channel;

transmitting the virtual program table;

receiving the transmitted virtual program table; and displaying the received virtual program table.

24. The virtual program table presenting method of claim 23, wherein the virtual channel includes a program not viewed by the first user.

25. The virtual program table presenting method of claim 23, further comprising replacing a program organized in the virtual channel with a program organized in the real channel based on the first value and the second value.

26. The virtual program table presenting method of claim 25, further comprising producing recording reservation setting scripts to generate control commands for recording, in a recording medium, a program organized in the virtual channel.

27. The virtual program table presenting method of claim 26, further comprising transmitting the program recording reservation setting scripts.

28. The virtual program table presenting method of claim 27, further comprising receiving the program recording reservation setting scripts.

29. The virtual program table presenting method of claim 23, further comprising receiving a program organized in the virtual channel.

30. The virtual program table presenting method of claim 28, further comprising converting the received program recording reservation setting scripts into a control signal.

31. The virtual program table presenting method of claim 29, further comprising recording, in a recording medium, the received program.

32. The virtual program table presenting method of claim 30, further comprising recording, in a recording medium the received program.

33. A system of recording programs comprising:

means for storing a program viewing history of viewed programs;

a virtual program table producing apparatus comprising:

means for producing user program viewing inclination information indicating a first program a first user views based on the stored program viewing history, the user program viewing inclination information including a first value indicating a number of times the first user views the first program, wherein the first value is a numerical value that is incremented each time the first user views the first program for an amount of time greater than a predetermined amount of time;

means for producing group program viewing inclination information indicating a second program a group of users view, based on the stored program viewing history, wherein the group program viewing inclination information includes a second value indicating a number of times the group of users view the second program;

means for receiving a policy value indicating a preference of the first user;

means for organizing a virtual channel by organizing programs broadcast in real channels having a predetermined frequency band into virtual channels based on the user program viewing inclination information, the group program viewing inclination information, and the policy value, wherein a number of programs organized in the virtual channels based on the user program viewing inclination information is in ratio with a number of programs organized in the virtual channels based on the group program viewing inclination information, the ratio being identified by the policy value; and means for accumulating program information as attribute information of programs broadcast in the real channels;

means for producing a virtual program table by fetching program information of the programs from the accumulated program information and associating the fetched program information, in the virtual program table, with the virtual channels;

first means for transmitting the virtual program table;

means for producing program recording reservation setting scripts generating a control command for recording, in a recording medium, a program arranged in the virtual channel; and second means for transmitting the program recording setting scripts;

a program recording reservation setting scripts receiving apparatus comprising:

means for inputting individual information of a user;

first means for receiving the transmitted virtual program table;

display means for displaying the received virtual program table;

second means for receiving the program recording reservation setting scripts transmitted by the second means for transmitting;

means for converting, into a control signal, the program recording reservation setting scripts received by the second means for receiving; and third means for transmitting the converted control signal; and a recording apparatus comprising:

third means for receiving a control signal transmitted by the third means for transmitting;

fourth means for receiving programs arranged in the virtual channel;

means for recording, in a recording medium, a program received by the fourth means for receiving; and means for controlling the means for recording, the means for recording, recording, in a recording medium, a program received by the fourth means for receiving in response to the control signal received by third means for receiving.

34. The program recording system of claim 33, wherein the virtual channel includes a program not viewed by the first user.

35. The program recording system of claim 33, wherein the virtual program table producing apparatus further comprises means for virtual channel changing replacing a program organized in the virtual channel with a program arranged in the real channel.

36. A program recording method performed by a virtual program table producing apparatus, the method comprising:

producing user program viewing inclination information indicating a first program a first user views based on a user's program viewing history, the user program viewing inclination information including a first value indicating a number of times the first user views the first program, wherein the first value is a numerical value that is incremented by the virtual program table producing apparatus each time the user views the first program for an amount of time greater than a predetermined amount of time;

inputting individual information indicating attributes of users;

classifying the users into groups based on the individual information;

producing group program viewing inclination information indicating a second program a group of users view, based on a program viewing history of the group of users, wherein the group program viewing inclination information includes a second value indicating a number of times the groups of users view the second program;

receiving a policy value indicating a preference of the first user;

organizing programs broadcast in real channels having a predetermined frequency band into virtual channels based on the, user program viewing inclination information, the group program viewing inclination information, and the policy value, wherein a number of programs organized in the virtual channels based on the user program viewing inclination information is in ratio with a number of programs organized in the virtual channels based on the group program viewing inclination information, the ratio being identified by the policy value;

producing program recording reservation setting scripts for generating control commands to record, in a recording medium, a program organized in the virtual channel;

transmitting the program recording reservation setting scripts;

receiving the transmitted program recording reservation setting scripts;

converting the received program recording reservation setting scripts into a control signal;

transmitting the control signal;

receiving the transmitted control signal;

receiving a program organized in the virtual channel in response to the received control signal; and recording the received program in a recording medium.

37. The program recording method of claim 36, wherein the virtual channel includes a program not viewed by the first user.

38. The program recording method of claim 36, further comprising replacing a program organized in the virtual channel with a program organized in the real channel based on the first value and the second value.

39. A virtual content program guide producing apparatus comprising:

means for storing content utilizing history of utilized contents;

means for producing user content utilizing inclination information indicating a first content a first user utilizes based on the stored content utilizing history, the user content utilizing inclination information including a first value indicating a number of times the first user utilizes the first content, wherein the first value is a numerical value that is incremented each time the first user utilizes the first content for an amount of time greater than a predetermined amount of time;

means for producing group content utilizing inclination information classifying users into a group based on individual information of the users and producing group content utilizing inclination information indicating a second content a group of users utilize based on the stored content utilizing history, wherein the group content utilizing inclination information includes a second value indicating a number of times the group of users utilize the second content;

means for detecting content information as attribute information of contents;

means for accumulating the detected content information;

means for receiving a policy value indicating a preference of the first user;

means for organizing a virtual content group by organizing contents of a real content group into a virtual group based on the produced content utilizing inclination information, the accumulated content information, and the policy value, wherein a number of contents organized in the virtual group based on the produced content utilizing inclination information is in ratio with a number of contents organized in the virtual group based on the accumulated content information, the ratio being identified by the policy value; and means for producing virtual content program guide by arranging the accumulated content information based on the virtual content group.

40. The virtual content program guide producing apparatus of claim 39, wherein the virtual content group includes content not utilized by the first user.

41. The virtual content program guide producing apparatus of claim 39, further comprising: means for transmitting the virtual content program guide.

42. The virtual content program guide producing apparatus of claim 39, wherein the means for organizing organizes the virtual content group by including time sequence information, extracted from the attribute information, of the contents in the virtual content group.

43. The virtual content program guide producing apparatus of claim 39, wherein the real content group is accumulated and administered by one or more content presenting devices for presenting contents to the first user.

* * * * *

UNITED STATES PATENT AND TRADEMARK OFFICE
CERTIFICATE OF CORRECTION

| | | |
|---|---|---|
| PATENT NO. | : 7,650,619 B2 | Page 1 of 1 |
| APPLICATION NO. | : 09/979969 | |
| DATED | : January 19, 2010 | |
| INVENTOR(S) | : Toru Mineyama | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1974 days.

Signed and Sealed this
First Day of March, 2011

David J. Kappos
*Director of the United States Patent and Trademark Office*